US012586566B1

(12) United States Patent (10) Patent No.: US 12,586,566 B1

Takbiriborujeni et al. (45) Date of Patent: Mar. 24, 2026

(54) MODEL DRIFT DETECTION TECHNIQUES

(71) Applicant: Amazon Technologies, Inc., Seattle, WA (US)

(72) Inventors: Ali Takbiriborujeni, Lynnwood, WA (US); Jainik Somabhai Patel, Bellevue, WA (US); Gaurav Gada, Seattle, WA (US); Tianqi Wu, Bothell, WA (US); Sagar Chaturvedi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 18/129,332

(22) Filed: Mar. 31, 2023

(51) Int. Cl.
| | |
|---|---|
| *G10L 15/06* | (2013.01) |
| *G06F 40/20* | (2020.01) |
| *G06N 3/02* | (2006.01) |
| *G06V 10/764* | (2022.01) |
| *G06V 10/774* | (2022.01) |
| *G10L 15/02* | (2006.01) |
| *G10L 15/18* | (2013.01) |
| *G10L 15/183* | (2013.01) |
| *G10L 15/22* | (2006.01) |

(Continued)

(52) U.S. Cl.
CPC ............ *G10L 15/063* (2013.01); *G06F 40/20* (2020.01); *G06N 3/02* (2013.01); *G06V 10/764* (2022.01); *G06V 10/774* (2022.01); *G10L 15/02* (2013.01); *G10L 15/1815* (2013.01); *G10L 15/183* (2013.01); *G10L 15/22* (2013.01); *G10L 25/30* (2013.01); *G10L 25/51* (2013.01)

(58) Field of Classification Search
CPC ............................... G10L 15/063; G06F 40/20
See application file for complete search history.

(56) References Cited

U.S. PATENT DOCUMENTS

| | | | |
|---|---|---|---|
| 10,558,759 B1 * | 2/2020 | Arfa | ........................ G06F 40/30 |
| 10,872,601 B1 * | 12/2020 | Acharya | ............... G06F 40/295 |

(Continued)

OTHER PUBLICATIONS

Robert Feldhans, et al. 2021. "Drift Detection in Text Data with Document Embeddings." 22nd International Conference on Intelligent Data Engineering and Automated Learning (IDEAL2021). [Preprint], DICE Research Group at Paderborn University (Paderborn, Germany). Retrieved from https://papers.dice-research.org/2021/IDEAL2021_DriftDetectionEmbeddings/Drift-Detection-in-Text-Data-with-Document-Embeddings-public, 12 pages.

(Continued)

*Primary Examiner* — Shaun Roberts

(74) *Attorney, Agent, or Firm* — Pierce Atwood LLP

(57) ABSTRACT

Techniques for detecting machine learning model drift are described. Model drift can result in the model misclassifying inputs. A system for detecting drift in natural language processing (NLP) models involves determining high-dimensional embeddings of inputs and high-dimensional embeddings of training samples, reducing the high-dimensional embeddings to low-dimensional embeddings, and comparing the low-dimensional embeddings to determine whether the inputs are statistically different than the training samples. When the inputs are statistically different than the training samples, model drift is detected, and retraining of the model may be performed. The system can detect drift in other classification models as well and can process with respect to other types of inputs (e.g., audio, image, etc.).

18 Claims, 9 Drawing Sheets

(51) Int. Cl.
    *G10L 25/30*       (2013.01)
    *G10L 25/51*       (2013.01)

(56)              References Cited

U.S. PATENT DOCUMENTS

| | | | | |
|---|---|---|---|---|
| 2006/0112040 | A1* | 5/2006 | Oda | G06F 16/355 |
| | | | | 707/E17.08 |
| 2014/0122039 | A1* | 5/2014 | Xu | G06F 18/213 |
| | | | | 703/2 |
| 2016/0358094 | A1* | 12/2016 | Fan | G06F 16/24578 |
| 2017/0330109 | A1* | 11/2017 | Maughan | G06N 5/04 |
| 2019/0156202 | A1* | 5/2019 | Falk | G06N 3/045 |
| 2020/0250274 | A1* | 8/2020 | Tan | G06N 3/045 |
| 2020/0251115 | A1* | 8/2020 | Farinelli | G06N 3/044 |
| 2020/0342310 | A1* | 10/2020 | Farchi | G06N 3/08 |
| 2021/0157990 | A1* | 5/2021 | Lima | H04L 51/02 |
| 2021/0158176 | A1* | 5/2021 | Wan | G06F 18/22 |
| 2021/0319174 | A1* | 10/2021 | Raj | G06F 40/242 |
| 2022/0101837 | A1* | 3/2022 | Nair | G06Q 30/0281 |
| 2022/0383038 | A1* | 12/2022 | Hines | G06N 3/045 |

OTHER PUBLICATIONS

Vikram Elango, et al. 2022. "Detect NLP data drift using custom Amazon SageMaker Model Monitor." AWS Machine Learning Blog, Jan. 18, 2022. Retrieved from https://aws.amazon.com/blogs/machine-learning/detect-nlp-data-drift-using-custom-amazon-sagemaker-model-monitor/, 12 pages.

\* cited by examiner

FIG. 3

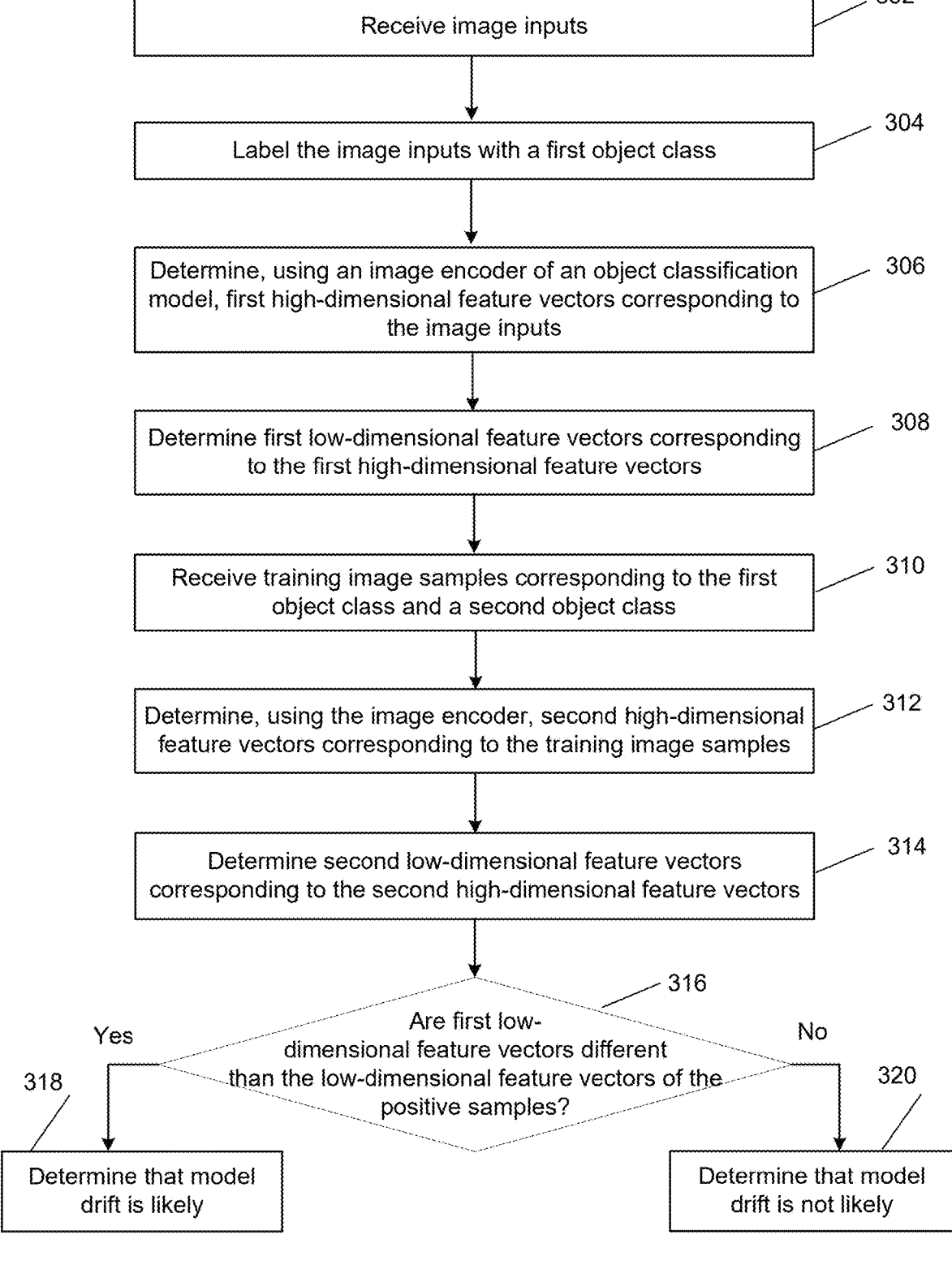

302 — Receive image inputs

304 — Label the image inputs with a first object class

306 — Determine, using an image encoder of an object classification model, first high-dimensional feature vectors corresponding to the image inputs 308 — Determine first low-dimensional feature vectors corresponding to the first high-dimensional feature vectors 310 — Receive training image samples corresponding to the first object class and a second object class 312 — Determine, using the image encoder, second high-dimensional feature vectors corresponding to the training image samples 314 — Determine second low-dimensional feature vectors corresponding to the second high-dimensional feature vectors 316 — Are first low-dimensional feature vectors different than the low-dimensional feature vectors of the positive samples?

Yes

318 — Determine that model drift is likely

No

320 — Determine that model drift is not likely

FIG. 4

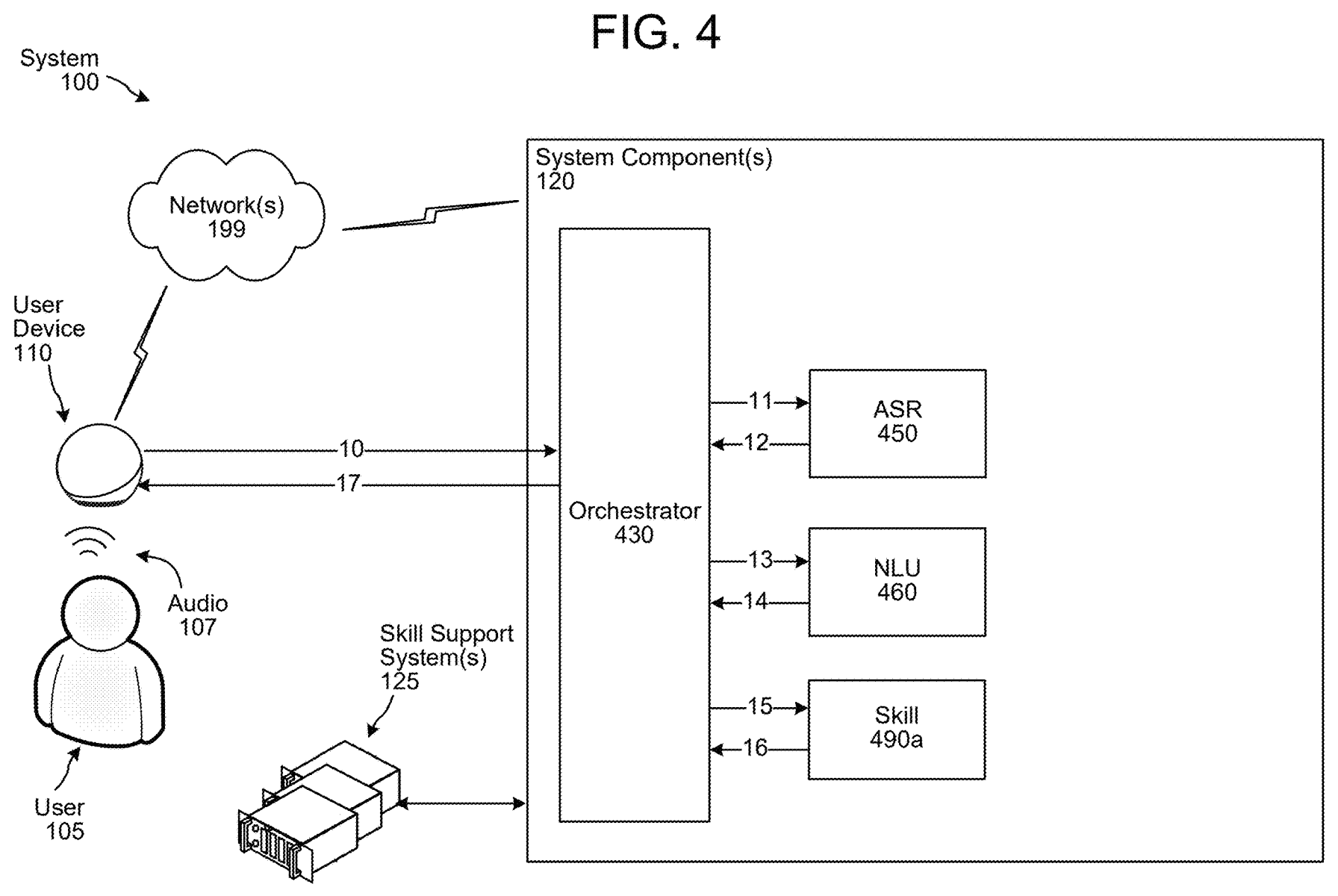

System Component(s)
120

ASR
450

NLU
460

Skill
490a

Orchestrator
430

Skill Support
System(s)
125

Network(s)
199

System
100

User
Device
110

Audio
107

User
105

FIG. 7

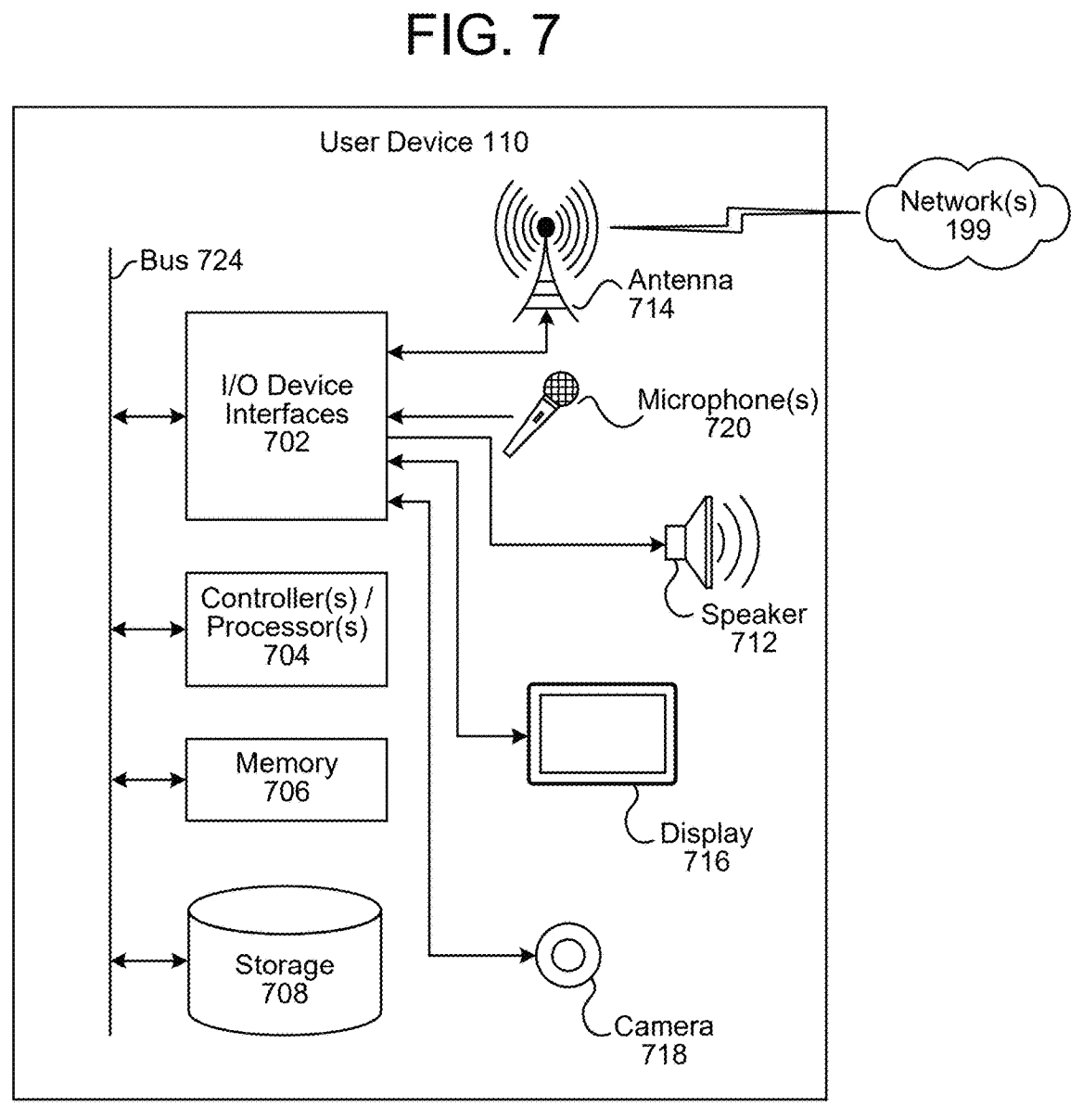

Network(s)
199

User Device 110

Antenna
714

Microphone(s)
720

Speaker
712

Display
716

Camera
718

I/O Device
Interfaces
702

Controller(s) /
Processor(s)
704

Memory
706

Storage
708

Bus 724

FIG. 8

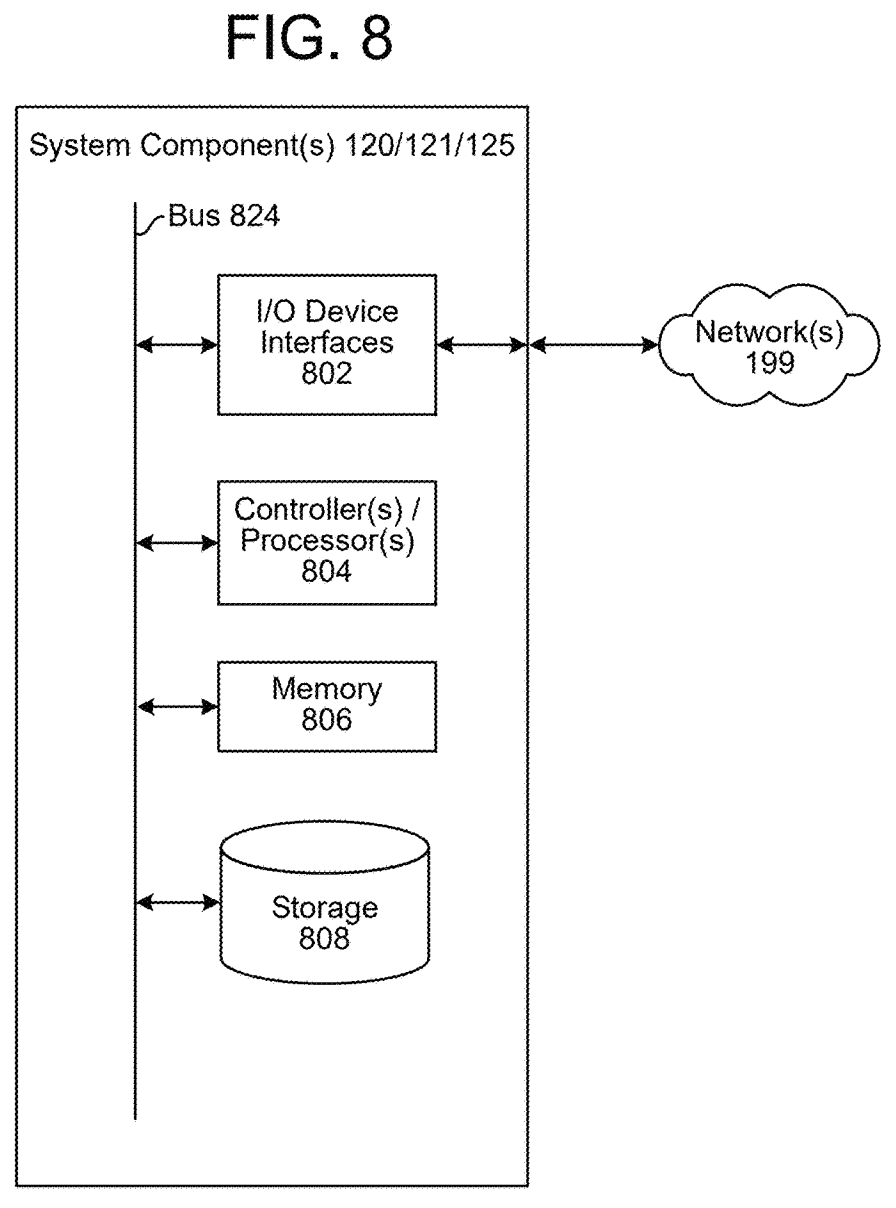

Network(s)
199

System Component(s) 120/121/125

Bus 824

I/O Device Interfaces 802

Controller(s) / Processor(s) 804

Memory 806

Storage 808

FIG. 9

MODEL DRIFT DETECTION TECHNIQUES

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as natural language processing (NLP). NLP may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 3 is a flowchart illustrating a process for detecting drift with respect to an image processing model, according to embodiments of the present disclosure.

FIG. 4 illustrates a system for processing a spoken natural language user input, according to embodiments of the present disclosure.

FIG. 7 is a block diagram conceptually illustrating example components of a device according to embodiments of the present disclosure.

FIG. 8 is a block diagram conceptually illustrating example components of a system according to embodiments of the present disclosure.

FIG. 9 illustrates an example of a computer network for use with the speech processing system.

DETAILED DESCRIPTION

Figure 1:
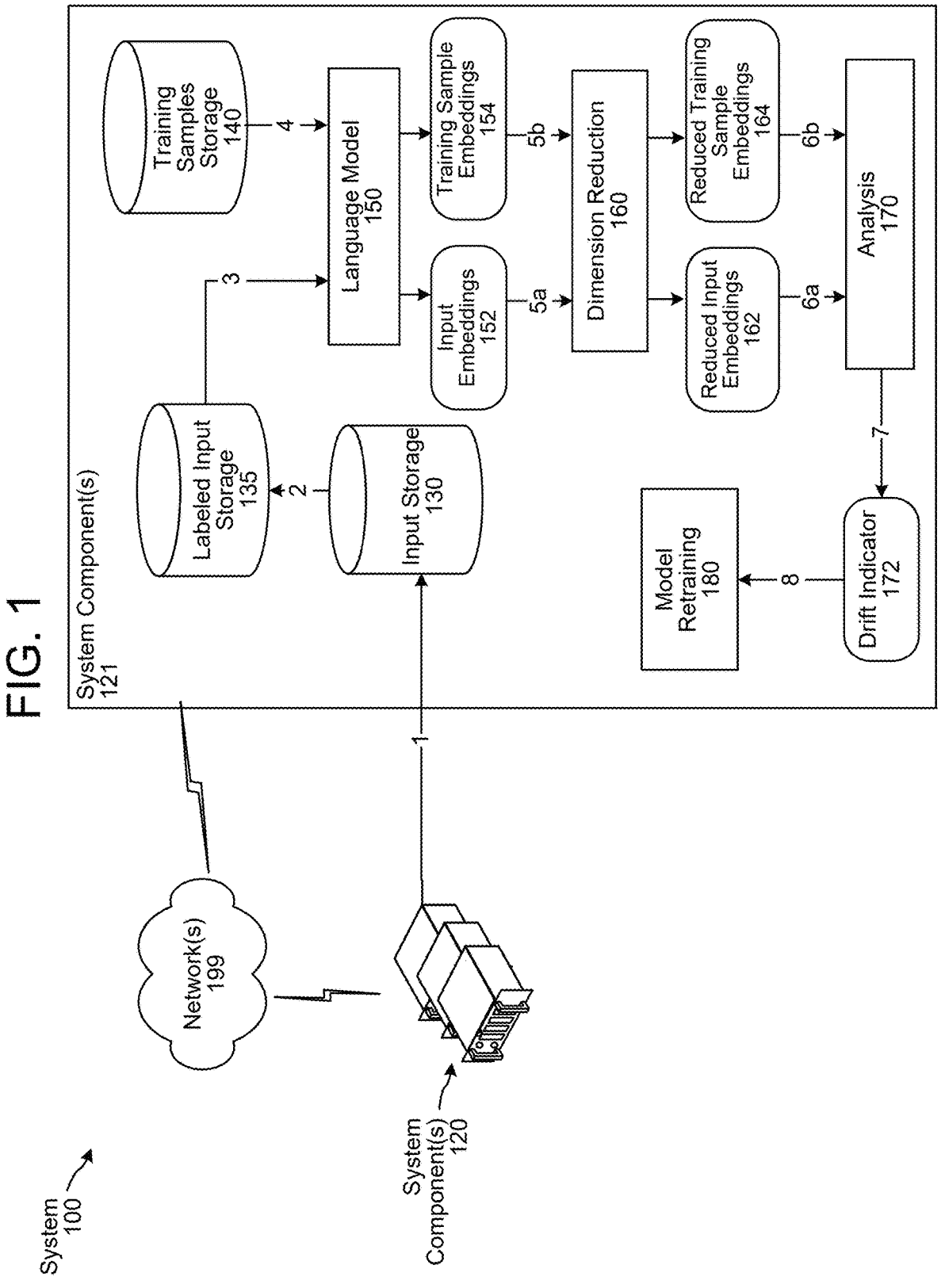
FIG. 1 illustrates a system for processing inputs and training samples to detect model drift, according to embodiments of the present disclosure.

Machine learning (ML) models can be used for processing various types of data and performing various types of tasks. For example, machine learning models may be used to perform automatic speech recognition (ASR) processing, natural language understanding (NLU) processing, user recognition processing, text-to-speech (TTS) processing, image processing, application/component routing, etc. ML models are often configured using training data to perform a particular task.

Certain ML models experience drift, which is decay of a model's predictive power usually because of the changes in the real world environments. ML models are often configured using training samples to make a prediction for an input sample during inference/runtime. As time passes, the distribution of the input samples changes. For example, in text classification tasks, a ML model may be built to assign labels to sentences based on the keywords that appear in the text. The distribution of the keywords used in the real world may change as time passes and the ML model cannot accurately predict labels for these keywords that have not been seen in the training data before. One solution is to re-train the model to recognize the newer input samples.

One approach for detecting model drift involves analyzing statistical changes in the model inputs and outputs. If the data has shifted, then drift is suspected in the model performance. Another approach involves calculating a model's performance, for example, precision, recall, etc., and detecting a drift if performance has decayed.

However for some ML models, such as ones used for NLP, it may be difficult to analyze the input data due to the high-dimensions of features extracted from the input data.

The present disclosure relates to techniques for detecting drift in ML models that process high-dimensional features. The techniques involve extracting high-dimensional features from input data received by a system and from training data used to configure a model, reducing dimensionality of the extracted features, and analyzing relative positioning and statistics of the input data and the training samples to detect model drift. For example, a ML model may be configured for a text classification task (such as intent classification) where it processes input text data to determine whether the input text data corresponds to a first (intent) class or a second (intent) class (or a non-first class). To detect drift, a system extracts high-dimensional features from input text samples, determines reduced dimensional input features, extracts high-dimensional features from training samples, and determines reduced dimensional training features. In some embodiments, the high-dimensional features may be reduced to two or three dimensions. At least a portion of the input text samples are labeled as corresponding to the first intent class. The system compares the reduced dimensional input features to the reduced dimensional training features to determine that the portion of the input text samples are mapping to the second intent class rather than the first intent class. Based on the input samples not mapping to the labeled first intent class, the system may determine that the model is experiencing drift.

In some embodiments, the system may employ statistical techniques to compare the reduced dimensional input features and the reduced dimensional training features. In some embodiments, the system may determine model drift based on the number of input samples whose features are mapping differently than their corresponding labeled class. When model drift is detected, the system may cause re-training of the ML model, where the training data for re-training can include the input samples analyzed for detecting drift.

Using the techniques of the present disclosure, an automated approach can be set up to present alerts when model drift occurs. Also an amount of input data to be collected to trigger the alert can be defined. Some embodiments involve presenting the reduced dimensional features via a graph or other mechanism to enable visualization of how input samples may be "drifting" from the training samples. After retraining, the model can be used to generate features, which can be used to visualize how the input samples map to the training samples after retraining.

The techniques of the present disclosure can be used to determine that model drift is occurring due to changes in the input samples; such determination may not be available by merely analyzing model performance metrics (e.g., recall, precision, etc.).

Techniques of the present disclosure may provide some advantages over other systems. For example, the system of the present disclosure can generate alerts as soon as drift is detected, so that the ML model can be updated to support changes in input samples. As a further example, the system improves accuracy in detecting model drift. As yet a further example, the system is not computational-intensive such that the model drift detection process can be run more frequently with fewer resources.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 for processing inputs and training samples to detect model drift, according to embodiments of the present disclosure. The system 100, among other things, may be configured to perform a text classification task. As shown in FIG. 1, the system 100 may include a system component(s) 120 (shown in further detail in FIGS. 4-5) connected to a system component(s) 121 across one or more networks 199. The network(s) 199 may include the Internet and/or any other wide or local area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system component(s) 121 may include an input storage 130, a labeled input storage 135, training samples storage 140, a language model 150, a dimension reduction component 160, and an analysis component 170.

In some embodiments, the system component(s) 121 may analyze natural language inputs provided by users. In such cases, the system component(s) 120 may receive multiple user inputs from multiple user devices 110 (shown in FIG. 4). The user inputs may be natural language inputs that may be spoken or entered as text (e.g., via a display screen, keyboard, etc. of the user device 110) by a user 105 (shown in FIG. 4). The user inputs may be processed by the system component(s) 120 as described in relation to FIGS. 4 and 5. The system component(s) 120 may perform NLP tasks to determine output data responsive to individual user inputs. The system component(s) 120 may store (step 1) data (e.g., text data, token data, etc.) representing the user inputs in the input storage 130.

In some embodiments, the system component(s) 121 may analyze system outputs, for example, outputs generated by a skill component(s) 490 (shown in FIG. 4). In such cases, the system component(s) 120 may store (step 1) data (e.g., text data, token data, etc.) representing the skill outputs in the input storage 130. The skill component(s) 490 may generate natural language outputs that may be presented via the user device 110 as displayed text, synthesized speech, notification, etc.

In some embodiments, the system component(s) 121 may analyze data generated by one of the system component(s) 120 while processing user inputs from the user device 110. For example, the system component(s) 120 may determine ASR data corresponding to a spoken user input. As another example, the system component(s) 120 may determine NLU data corresponding to natural language user input. In such cases, the system component(s) 120 may store (step 1) the ASR data or the NLU data in the input storage 130.

In some embodiments, the system components 121 and the system components 120 may be in communication with each other. In other embodiments, the system components 121 and the system components 120 may be implemented within the same computing device rather than separate computing devices.

The input storage 130 may store text data, token data, or other word representation data representing individual inputs. The inputs may be stored without user identifying data, and may be anonymized, edited to remove user identifying information, such as, person names, addresses, phone numbers, etc.

The inputs may be labeled with a class based on the text classification task that model drift is being detected for. The labeled inputs may be stored (step 2) in the labeled input storage 135. In example embodiments, the text classification task may be configured to assign a class label or non-class label to inputs. In other example embodiments, the text classification task may be configured to assign a class label from a set of class labels. For example, for a text-based intent classification task for natural language user inputs, the ML model may assign a first intent label (e.g., PlayMusicIntent), a second intent label (e.g., WeatherIntent), a third intent label (e.g., PlayMessagesIntent), etc.

As another example, a ML model may be configured to determine whether system outputs include certain type of language, such as violence-directed language, profanity, child-appropriate, etc. In such examples, a ML model may assign a first class label (e.g., violence), a second class label (e.g., non-violence), a third class label (e.g., profanity), a fourth class label (e.g., child appropriate), etc.

The inputs in the labeled input storage 135 may be labeled with the corresponding correct class that the text classification task is to assign to the input. The class label may be represented as text, a Boolean value, an alphanumerical value, etc. The inputs may be labeled manually.

The training samples storage 140 may store data representing training data used to configure the text classification task. The training samples storage 140 may store text data, token data or other word representation data representing positive and negative samples for a class, where individual samples may be labeled with a corresponding class. The class label may be represented as text, a Boolean value, an alphanumerical value, etc.

The language model 150 may be a portion/component of a ML model configured to perform the text classification task. The language model 150 may be configured to process an input to generate high-dimensional feature vector(s) that is used by the remaining ML model portions/components to assign a class label (e.g., an intent label) to the input. In example embodiments of the text classification task, the ML model may be a transformer-based model. In example embodiments of the text classification task, the language model 150 may be a Bidirectional Encoder Representations from Transformers (BERT) model.

The language model 150 may receive (step 3) labeled inputs from the labeled input storage 135 and may process them to generate corresponding input embeddings 152. The input embeddings 152 may include embeddings for individual labeled inputs (e.g., a first embedding corresponding to a first input, a second embedding corresponding to a second input, etc.). The input embeddings 152 may be high-dimensional feature vectors. In example embodiments, where the language model 150 is a BERT model, a input embedding may be of approximately 768 dimensions.

The language model 150 may receive (step 4) the training samples from the training samples storage 140 and may process them to generate corresponding training sample embeddings 154. The training sample embeddings 154 may include embeddings for individual training samples (e.g., a first embedding corresponding to a first training sample, a second embedding corresponding to a second training sample, etc.). The training sample embeddings 154 may be high-dimensional feature vectors. In example embodiments, where the language model 150 is a BERT model, a training sample embedding 154 may be of approximately 768 dimensions.

The dimension reduction component 160 may be configured to process high-dimensional feature vectors to generate corresponding low-dimensional feature vectors. The dimension reduction component 160 may employ machine learning models, statistical models, probabilistic models, etc. to project data of a high-dimensional space into a low-dimensional space.

In example embodiments, the dimension reduction component 160 may employ a Uniform Manifold Approximation and Projection (UMAP) mechanism, which is a dimension reduction technique that can be used for visualization and also for general non-linear dimension reduction. The UMAP mechanism may operate on three assumptions about the input data, that the data is uniformly distributed on Riemannian manifold, the Riemannian metric is locally constant (or can be approximated as such), and the manifold is locally connected.

In other example embodiments, the dimension reduction component 160 may employ a Principal Component Analysis (PCA) mechanism, which is a linear dimensionality reduction technique that converts a set of correlated features in the high dimensional space into a series of uncorrelated features in the low dimensional space.

In yet other example embodiments, the dimension reduction component 160 may employ a T-distributed Stochastic Neighbor Embedding (t-SNE) mechanism, which is a non-linear dimensionality reduction technique that can transform high dimension embedding data into lower dimensional data.

The dimension reduction component 160 may receive (steps 5a and 5b) the input embeddings 152 and the training sample embeddings 154. The dimension reduction component 160 may generate reduced input embeddings 162 corresponding to the input embeddings 152, where the reduced input embeddings 162 may be low-dimensional representations of the high-dimensional feature vectors included in the input embeddings 152. The dimension reduction component 160 may generate reduced training sample embeddings 164 corresponding to the training sample embeddings 154, where the reduced training sample embeddings 164 may be low-dimensional representations of the high-dimensional feature vectors included in the training samples embeddings 154. A dimensionality of a low-dimension feature vector may be smaller than a dimensionality of a high-dimension feature vector. In some embodiments, a high-dimensional feature vector may have a dimension more than 100 and a low-dimensional feature vector may have a dimension less than 20. In some embodiments, the reduced input embeddings 162 and the training sample embeddings 164 may be 2-dimensional feature vectors. In other embodiments, the reduced input embeddings 162 and the training sample embeddings 164 may be 3-dimensional feature vectors. The reduced input embeddings 162 may include corresponding class labels (that are stored in the labeled input storage 135). The training sample embeddings 164 may include corresponding class labels (that are stored in the training samples storage 140).

The analysis component 170 may be configured to analyze the reduced inputs embeddings 162 and the reduced training sample embeddings 164 to determine differences between the reduced input embeddings 162 (which represents "new" data samples) and the reduced training sample embeddings 164 (which presents "old" data samples). Based on the differences satisfying a condition(s), the analysis component 170 may determine that the model is likely to experience drift, in which case re-training of the ML model should be performed.

The analysis component 170 may determine relative positioning and statistics of the reduced input embeddings 162 and compare them to those for the reduced training sample embeddings 164. In some embodiments, the analysis component 170 may employ statistical techniques to perform hypothesis testing based on distributions of the embeddings. For example, the analysis component 170 may perform a statistical significant test to determine if the distribution of the incoming data, represented by the reduced input embeddings 162, is significantly different from the distribution of the training data, represented by the reduced training sample embeddings 164. The statistical significant test may take into consideration the number of samples (e.g., user input embeddings 162) that are different to determine that the difference is statistically significant.

In an example embodiment, the analysis component 170 may generate one or more P-values from various test scores, such as Z-score, T-score, etc. As such, the P-value(s) may be a function of the means and standard deviations of the data samples and may also depend on the number of data samples analyzed. The analysis component 170 may compare the P-value(s) with a significance level to determine if the null hypothesis, $H_0$ can be rejected. The null hypothesis, in an example case, may state that two distributions are not significantly different from one another. If the P-value(s) falls below the significance level, then the result is statistically significant, i.e., the two distributions are significantly different from one another. If the P-value(s) falls above the significance level, then the result is not statistically significant, i.e., the two distributions are not significantly different from one another. In some embodiments, the significance level may be 0.05 (5%), such that data rejecting the null hypothesis is likely to occur less than 5% of the time.

In some embodiments, the analysis component 170 may perform the Kernel Two-Sample Test, which is based on Maximum Mean Discrepancy (MMD), to compare the distributions of the user input samples and the training samples. MMD is the squared distance between the embeddings of two distributions in a reproducing kernel Hilbert space.

In other embodiments, the analysis component 170 may perform the Kolmogorov-Smirnov test, which is a non-parametric test to compare the cumulative distributions of two groups. It may test the null hypothesis that two independent samples are drawn from the same continuous distribution. The Kolmogorov-Smirnov test statistic is the maximum absolute difference between the two cumulative distributions which gives a notion of distance between the two distributions. The bigger this difference value is, the more different the distributions are It also returns a P-value which provides the significance of the statistical test, i.e., how much the test can be relied upon (e.g., P-value <0.05). In some cases, to use the Kolmogorov-Smirnov test, the embeddings may have to be transformed to unidimensional. The analysis component 170 or the dimension reduction component 160 may use the norm of the vectors or Mahalanobis distance to determine unidimensional versions of the embeddings.

The analysis component 170 may receive (steps 6a-6b) the reduced input embeddings 162 and the reduced training sample embeddings 164. The analysis component 170 may perform statistical analysis as described above and compare the distributions of the reduced input embeddings 162 and the reduced training sample embeddings 164.

Based on processing the reduced input embeddings 162 with respect to the training sample embeddings 164, the analysis component 170 may output a drift indicator 172. The drift indicator 172 may be a Boolean value, a numerical value, text, etc. If the reduced input embeddings 162 are significantly different than the reduced training sample embeddings 164, then the analysis component 170 may determine that the text classification ML model is likely to experience drift; that is, the ML model is likely to misclassify the inputs. In such cases, the analysis component 170 may output the drift indicator 172 representing that model drift is likely. For example, the drift indicator 172 may be "true", "1", "yes" or other affirmative indicators.

If the reduced input embeddings 162 are not significantly different than the reduced training sample embeddings 164, then the analysis component 170 may determine that the text classification ML model is not likely to experience drift; that is, the ML model is likely to accurately classify the inputs. In such cases, the analysis component 170 may output the drift indicator 172 representing that model drift is not likely. For example, the drift indicator 172 may be "false", "0", "no" or other negative indicators.

The system component(s) 121 may be configured to process with respect ML models that classify inputs into more than one class, e.g., a first class, a second class, a third class, etc. In such cases, the labeled input storage 135 may store a first set of inputs corresponding to and labeled with a first class indicator, a second set of inputs corresponding to and labeled with a second class indicator, a third set of inputs corresponding to and labeled with a third class indicator, etc. Similarly, the training samples storage 140 may store a first set of training samples corresponding to and labeled with a first class indicator (e.g., a first intent), a second set of training samples corresponding to and labeled with a second class indicator (e.g., a second intent), a third set of training samples corresponding to and labeled with a third class indicator (e.g., a third intent), etc.

The analysis component 170 may determine model drift based on processing with respect to individual classes that the ML model is configured to predict. The analysis component 170 may perform statistical analysis for inputs and training samples corresponding to a particular class, e.g., the first class, and compare the distributions of the reduced input embeddings 162 and the reduced training sample embeddings 164 for the first class. Based on the foregoing processing with respect to the first class, the analysis component 170 may determine whether the ML model is likely to misclassify inputs for the first class by classifying them to another/second class (i.e., model drift is likely to occur with respect to the first class).

In some embodiments, the analysis component 170 may output a drift indicator 172 for individual classes (e.g., first drift indicator 172a for a first class, a second drift indicator 172b for a second class, a third drift indicator 172c for a third class, etc.) representing whether the ML model is likely to misclassify inputs corresponding to the respective class.

The analysis component 170 may output a vector including the drift indicators 172 for individual classes.

In other embodiments, the analysis component 170 may determine a single drift indicator 172 based on combining the drift determinations for individual classes. For example, the analysis component 170 may determine that drift is likely to occur based on a threshold number of classes likely to be misclassified by the ML model. As another example, the analysis component 170 may determine that drift is likely to occur based on at least one class likely to be misclassified by the ML model.

The drift indicator 172 may be sent (step 8) to a device or another component, such as a model retraining component 180. Based on the drift indicator 172 representing drift is likely to occur, a user or an automated process may initiate, via the model retraining component 180, re-training of the text classification ML model, which includes the language model 150. The re-training may be performed using training data that includes the labeled inputs from the labeled input storage 135, in addition to the training samples from training samples storage 140. In some examples, the training data may include labeled inputs for the class or classes that are likely to be misclassified by the ML model as determined by the analysis component 170. As such, the language model 150 may be retrained to generate appropriate feature vectors which enables the text classification model to correctly classify inputs.

The example in relation to FIG. 1 describes a text classification task. Similar process as described in relation to FIG. 1 can be applied to various classifier model tasks. Example model tasks include intent classification, domain classification, named entity recognition, other classifications performed by an NLU component 460; image classification performed by an image processing component 540, audio classification, etc. Other example model tasks include text-based sentiment detection, audio-based sentiment detection, image-based sentiment detection, object detection, gesture detection, etc. The process can be applied to ML models that may be implemented by other system components 120 shown in FIG. 5 (e.g., user recognition component 595, system-directed input detector 585, wakeword detection component 520, etc.). The process can be applied to different types of embeddings/inputs, e.g., text inputs, image inputs, audio inputs, etc.

The process in FIG. 1 can be triggered as a scheduled process on a periodic basis, e.g., weekly basis, monthly basis, etc. In other cases, the process can be triggered by a user (e.g., an administrator, a developer, etc.). In yet other cases, the process can be triggered based on user feedback related to the ML model's performance. For example, the process may be triggered if feedback from one or more users of the system 100 indicate that user inputs are being classified incorrectly.

Figures 2A, 2B:
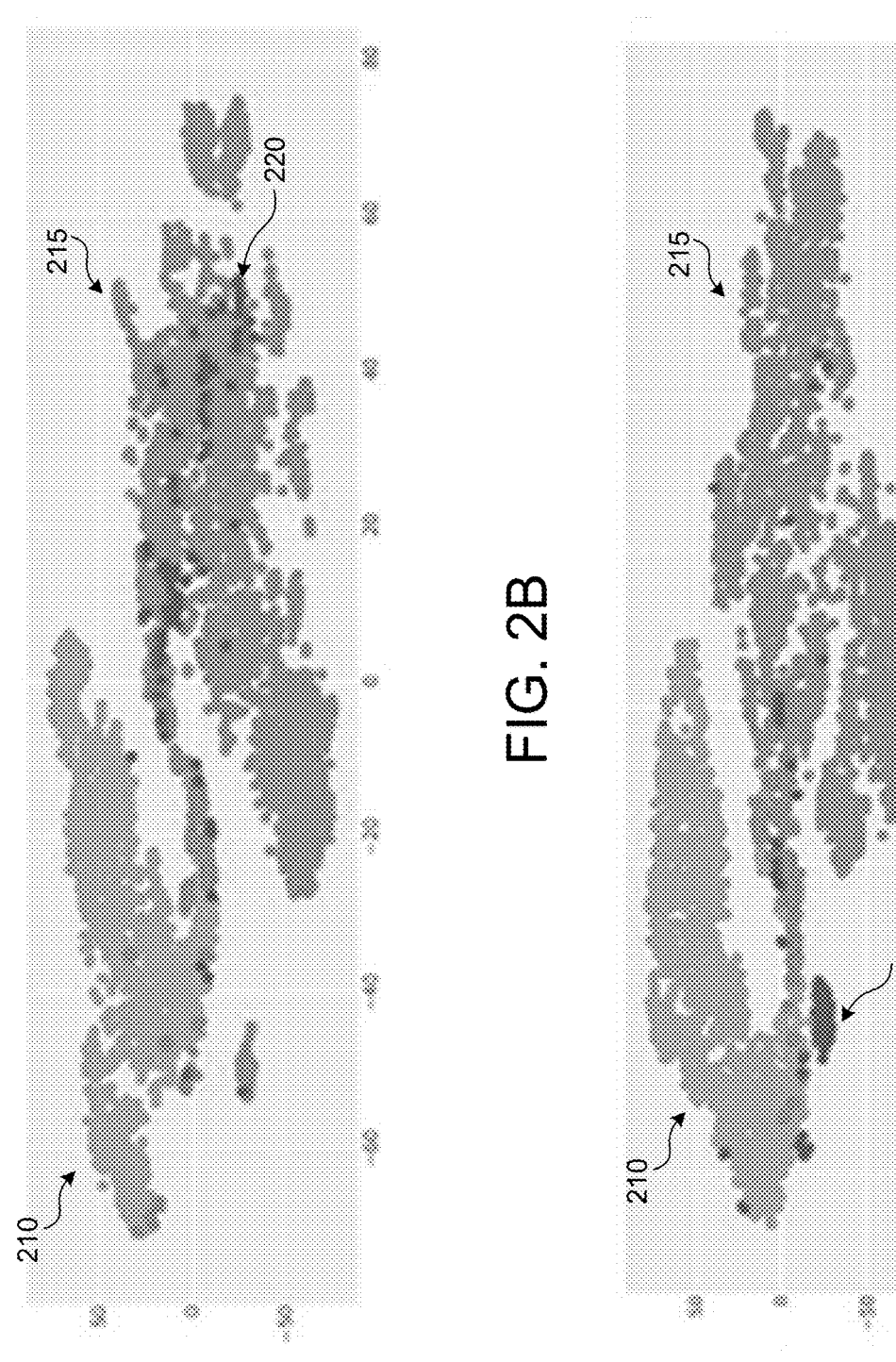
FIGS. 2A and 2B show example visualizations of reduced-dimension embedding data representing user inputs and training samples corresponding to two classes.

FIG. 2A is a graph showing reduced dimension embeddings before a ML model is retrained, where the ML model may be configured to classify inputs to one class. The embeddings indicated in light shading 210 may be training samples corresponding to the class (e.g., class/positive samples). The embeddings indicated in medium shading 215 may be training samples not corresponding to the class (e.g., non-class/negative samples). The embeddings indicated in dark shading 220 may be user inputs received by the system 100 and labeled as corresponding to the class. As can be seen by the dots corresponding to the dark shading 220 in FIG. 2A, a number of the input embeddings are closer to the negative class of the training samples indicated by the medium shading 215. This suggests that the ML model is likely to misclassify the user inputs as negative samples. The system component(s) 121, through comparison of the distribution of the input embeddings and the training sample embeddings, can identify that they are significantly different (through statistical significant testing). Using the statistical significant test, the system component(s) 121 also considers how many data points are required to make the foregoing conclusion.

FIG. 2B is a graph showing reduced dimension embeddings after the ML model is retrained. The embeddings indicated in light shading 210 are the positive training samples corresponding to the class. The embeddings indicated in medium shading 215 are the negative training samples not corresponding to the class. The embeddings indicated in dark shading 220 are the input embeddings corresponding to the class. As it can be seen in FIG. 2B, the input embeddings in dark shading 220 are closer to the positive training samples of the class.

Configuring an ML model can involve determining various parameters, such as hyper-parameters, weights, architecture, and other types of data associated with the model. These parameters depend on the type of ML model being configured. For example, while configuring a neural network, the hyper-parameters that are determined may relate to a number of layers in the network, a learning rate, a number of neurons in the network, a number of hidden layers, batch size, number of epochs, etc. In another example, configuring a support vector machine (SVM) may involve determining a kernel (a type of hyper-parameter).

FIG. 3 is a flowchart illustrating a process for detecting drift with respect to an image processing model, such as one configured to perform an object classification task. The system component(s) 121 may receive (step 302) multiple image inputs. In some cases, the image inputs may be captured via a camera or another sensor of the user devices 110. For the example process of FIG. 3, the image inputs may include a representation of a first object (e.g., a coffee mug). The image inputs may be labeled (step 304) with a first object class corresponding to the first object represented in the image inputs. For other types of image classification tasks, the image inputs may include a user's face, a gesture performed by a user, a scene, etc.

The object classification model may include an image encoder to generate feature vectors from input images. The image encoder may be configured/trained to generate feature vectors related to the object classification task. Using the image encoder, the system component(s) 121 may determine (step 306) first high-dimensional feature vectors corresponding to the image inputs. The first high-dimensional feature vectors may be of a first dimensionality/size. The system component(s) 121 may determine (step 308) first low-dimensional feature vectors corresponding to the first high-dimensional feature vectors. The first low-dimensional feature vectors may be determined using a dimension reduction technique described above in relation to the dimension reduction component 160. The first low-dimensional feature vectors may be of a second dimensionality/size that is lower than the first dimensionality/size.

The system component(s) 121 may receive (step 310) multiple training image samples corresponding to the first object class and to a second object class. A portion of the training image samples may be positive samples and may include a representation of the first object (e.g., a coffee mug). Another remaining portion of the training image samples may be negative samples and may include a representation of another/second object (e.g., an object other than a coffee mug). Using the image encoder, the system component(s) 121 may determine (step 312) second high-dimensional corresponding to the training image samples. The second high-dimensional feature vectors may be of the first dimensionality/size. The system component(s) 121 may determine (step 314) second low-dimensional feature vectors corresponding to the second high-dimensional feature vectors. The second low-dimensional feature vectors may be determined using a dimension reduction technique described above in relation to the dimension reduction component 160. The second low-dimensional feature vectors may be of the second dimensionality/size that is lower than the first dimensionality/size.

The system component(s) 121 may determine (decision step 316) whether the first low-dimensional feature vectors are different than the second low-dimensional feature vectors corresponding to the positive samples/the first object class are different. For example, as described above in relation to the analysis component 170, the system component(s) 121 may determine, using a statistical significant test, whether the first low-dimensional feature vectors, which correspond to the first object class, are statistically different than a portion of the second low-dimensional feature vectors, which correspond to the first object class. If the first low-dimensional feature vectors are different than the portion of the second low-dimensional feature vectors (that is the embeddings of the image inputs are different than the embeddings of the positive samples) then the system component(s) 121 may determine (step 318) that model drift is likely (i.e., the object classification model is likely to misclassify the image inputs). If the first low-dimensional feature vectors are not different than the portion of the second low-dimensional feature vectors (that is the embeddings of the image inputs are similar to the embeddings of the positive samples) then the system component(s) 121 may determine (step 320) that model drift is not likely (i.e., the object classification model is likely to classify the image inputs correctly). Based on detecting model drift, the object classification model may be retrained using at least the image inputs corresponding to the first class. In retraining the object classification model, the image encoder may also be retrained.

A similar process can be used for detecting drift with respect to an audio processing model, such as one configured to perform an audio event classification task or sentiment classification from speech. High-dimensional audio features corresponding to audio inputs and training audio samples may be generated using an audio encoder included in the audio processing model. The audio inputs may correspond to a first class (e.g., for audio event classification task-a dog barking audio event, an alarm audio event, etc.; for sentiment classification task-happy sentiment, sad sentiment, etc.). The training audio samples may correspond to multiple classes, including the first class. The audio encoder may be configured/trained to generate features related to the respective task—the audio event classification task or sentiment classification task. The high-dimensional audio features may be reduced to generate low-dimensional audio features. Using the low-dimensional audio features, the system component(s) 121 may determine whether the embeddings of the audio inputs are different than the embeddings of the training audio samples corresponding to the first class. If the low-dimensional feature vectors are different then the system component(s) 121 may determine drift is likely to occur (i.e., the audio processing model is likely to misclassify the audio inputs). In such cases, the audio processing model, including the audio encoder, may be retrained using the at least the audio inputs corresponding to the first class.

The operations herein to predict model drift may be performed with a wide variety of models. Automatic speech recognition (ASR) is a field of computer science, artificial intelligence, and linguistics concerned with transforming audio data associated with speech into words (e.g., text, tokens, etc.) representative of that speech. Natural language understanding (NLU) is a field of computer science, artificial intelligence, and linguistics concerned with enabling machines to derive meaning from input containing natural language. Natural language generation (NLG) is a field of artificial intelligence concerned with automatically transforming data into natural language (e.g., English) content. Text-to-speech (TTS) is a field concerning transforming data into audio data that is synthesized to resemble human speech. ASR, NLU, NLG, and TTS may be used together as part of a speech-processing system. The techniques described herein may be used to determine model drift related to models used to perform ASR, NLU, NLG, TTS, some other aspect of speech-processing, and/or other non-speech-processing tasks.

Certain systems may be configured to perform actions responsive to user inputs. For example, for the user input of "Alexa, play music by [artist]," a system may output music sung by the indicated artist. For further example, for the user input of "Alexa, what is the weather in [city]," a system may output synthesized speech representing weather information for the indicated city. In a further example, for the user input of "Alexa, send a message to [recipient]," a system may capture spoken message content and cause the same to be output via a device of the indicated recipient. In the foregoing examples, the actions correspond to outputting music, outputting synthesized speech, and causing spoken message content to be output.

FIG. 4 illustrates a system for processing a spoken user input, according to embodiments of the present disclosure. As shown in FIG. 4, the system 100 may include a user device 110, local to a user 105, and a system component(s) 120 connected, to the user device 110, across one or more networks 199. The network(s) 199 may include the Internet and/or any other wide or local area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system component(s) 120 may include one or more speech processing components configured to process spoken natural language inputs using ASR and NLU processing. The system component(s) 120 may also be configured to process non-spoken inputs, such as gestures, textual inputs, selection of GUI elements, selection of device buttons, etc. The system component(s) 120 may include multiple components to facilitate user input processing, some of which are described below in relation to FIG. 5. In example embodiments, the system component(s) 120 may send inputs to the system component(s) 121, where the inputs may be based on processing the user inputs as described below. For example, the system component(s) 120 may send, to the system component(s) 121, data representing the user input (e.g., text data, token data, ASR data, image data, etc.), NLU data corresponding to the user input, data representing the skill output (e.g., text data, token data, natural language output, etc.), and the like.

As shown in FIG. 4., the system component(s) 120 may include an orchestrator component 430, an ASR component 450, a NLU component 460 and a skill component 490a.

The system component(s) 120 may be in direct, wired or wireless communication, over the network(s) 199, with one another. The orchestrator component 430 may be configured to route data to the appropriate components of the system component(s) 120 to facilitate processing of and response to a user input. However, the present disclosure is not intended to be limited to such a configuration. In some embodiments, the user device 110 may include or otherwise be configured to perform the herein disclosed processing of one or more of the orchestrator component 430, the ASR component 450, the NLU component 460, and the skill component 490a.

The user 105 may speak an input, and the user device 110 may capture audio 107 representing the spoken input. The user device 110 may send (step 10) audio data (e.g., audio data 511/611 illustrated in FIGS. 5/6, respectively) to the system component(s) 120 for processing. In some embodiments, the user device 110 may send the audio data 511/611 after the user 105 has finished speaking. In other embodiments, the user device 110 may send the audio data 511/611 in a streaming fashion until an endpoint of speech in the audio 107 is determined.

The orchestrator component 430 may send (step 11) the audio data 511/611 to the ASR component 450 for processing. The ASR component 450 may process the audio data 511/611 to determine ASR data (e.g., token data, text data, ASR hypotheses including token or text data and corresponding confidence scores, etc.) representing the words spoken by the user 105.

The ASR component 450 may send (step 12) the ASR data to the orchestrator component 430. The ASR data may include one or more ASR hypotheses corresponding to words spoken by the user 105, where an ASR hypothesis may include text data, token data or other word representation data, and a corresponding ASR confidence score.

The orchestrator component 430 may send (step 13) the ASR data to the NLU component 460. The NLU component 460 may attempt to make a semantic interpretation of the word(s) or statement(s) represented in the spoken input by determining one or more meanings associated with the word(s) or statement(s) indicated in the phoneme data and the ASR data. The NLU component 460 may determine an intent representing an action that a user desires be performed and may determine information that allows a system component and/or device to execute the intent. The NLU component 460 may determine NLU data including one or more NLU hypotheses, where individual NLU hypotheses may include a corresponding domain indicator, intent indicator, entity data (e.g., entity types, entity values), skill indicator, and/or NLU confidence score. The NLU component 460 may send (step 14) the NLU data to the orchestrator component 430.

The orchestrator component 430 may send (step 15) the NLU data to the skill component 490a. As described below, the orchestrator component 430 may send the NLU data to the skill component 490a based on the skill component 490a being capable of generating output data responsive to the command included in the spoken input from the user 105. In some embodiments, the skill component 490a may communicate with a skill support system(s) 125 to generate the output data.

The skill component 490a may determine output data responsive to the spoken input. The output data may correspond to a natural language output which may be presented by the device 110 as synthesized speech or displayed text. The output data may include text, other type natural language representation data, images, graphics, etc.

The skill component 490*a* may send (step 16) the output data to the orchestrator component 430. The orchestrator component 430 may send (step 17) data to the user device 110 causing it to perform an action in accordance with the output data from the skill component 490*a*. The user device 110 may present audio representing synthesized speech, may display text, graphics, images, etc., may output a notification (e.g., an app notification, a push notification, etc.), may cause a light (e.g., a yellow light ring) or other visual output device to activate, etc. The output data may be presented via the user device 110 or via another device that is associated with the user 105.

Figure 5:
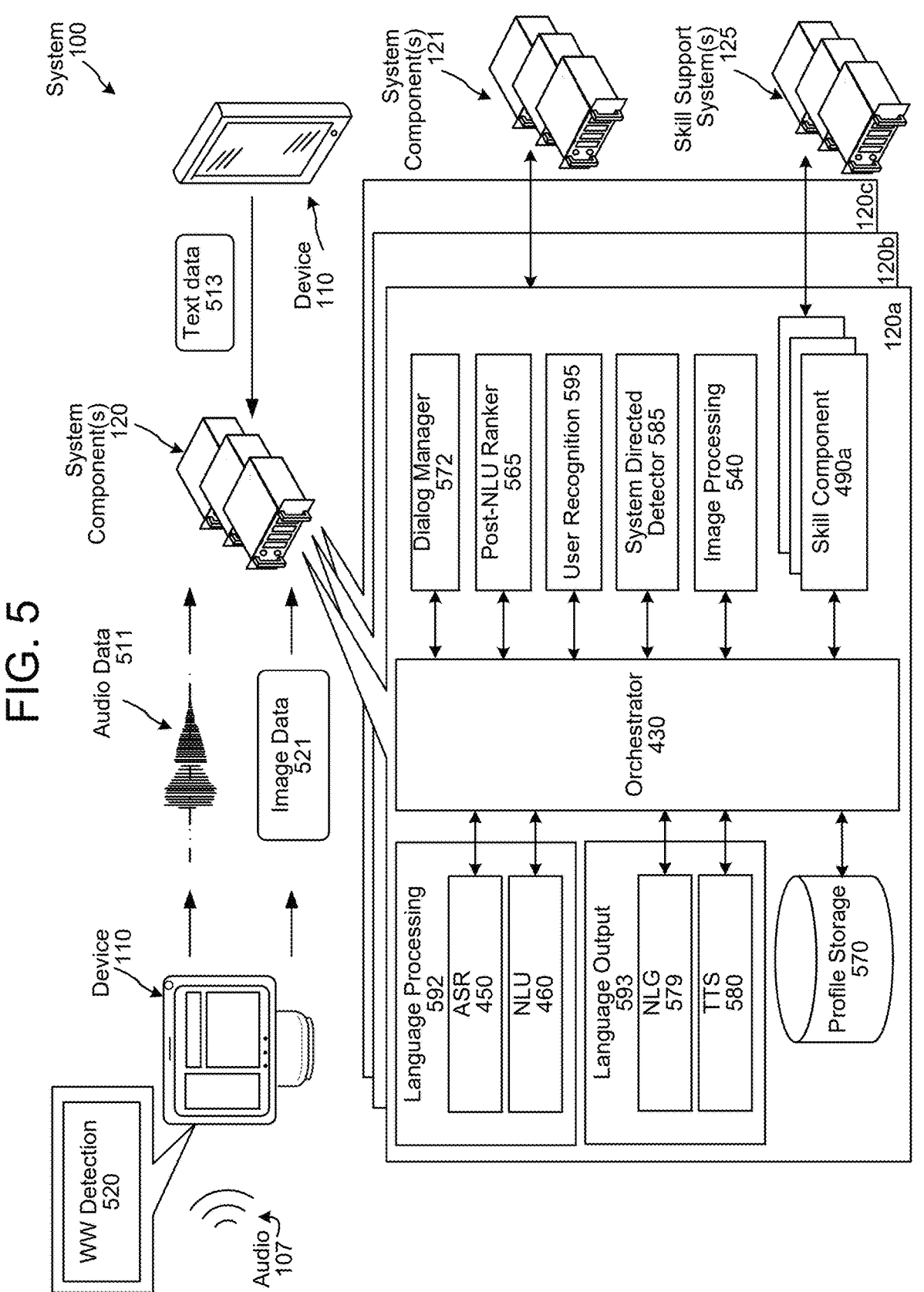
FIG. 5 is a conceptual diagram of components of the system, according to embodiments of the present disclosure.

The system 100 may operate using various components as described in FIG. 5. The various components may be located on same or different physical devices. Communication between various components may occur directly or across a network(s) 199. The device 110 may include audio capture component(s), such as a microphone or array of microphones of a device 110, captures audio 107 and creates corresponding audio data. Once speech is detected in audio data representing the audio 107, the device 110 may determine if the speech is directed at the device 110/system component(s) 120. In at least some embodiments, such determination may be made using a wakeword detection component 520.

The wakeword detection component 520 may process the audio data, representing the audio 107, to determine whether speech is represented therein. The user device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection may be performed without performing linguistic analysis, textual analysis, or semantic analysis. Instead, the audio data, representing the audio 107, is analyzed to determine if specific characteristics of the audio data match preconfigured acoustic waveforms, audio signatures, or other data corresponding to a wakeword. Thus, the wakeword detection component 520 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech can include other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 520 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 520, the user device 110 may "wake" and begin transmitting audio data 511/611 (shown in FIGS. 5 and 6), representing the audio 107, to the system component(s) 120. The audio data 511 may include data corresponding to the wakeword.

The wakeword detection component 520 may be configured to detect various wakewords. In at least some examples, each wakeword may correspond to a name of a different digital assistant. An example wakeword/digital assistant name is "Alexa." In another example, input to the system may be in form of text data 513, for example as a result of a user typing an input into a user interface of device 110. Other input forms may include indication that the user has pressed a physical or virtual button on device 110, the user has made a gesture, etc. The device 110 may also capture images using camera(s) 718 of the device 110 and may send image data 521 representing those image(s) to the system component(s) 120. The image data 521 may include raw image data or image data processed by the device 110 before sending to the system component(s) 120. The image data 521 may be used in various manners by different components of the system to perform operations such as determining whether a user is directing an utterance to the system, interpreting a user command, responding to a user command, etc.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

Once the wakeword is detected by the wakeword detection component 520 and/or input is detected by an input detector, the device 110 may "wake" and begin transmitting audio data 511, representing the audio 107, to the system component(s) 120. The audio data 511 may include data corresponding to the wakeword; in other embodiments, the portion of the audio corresponding to the wakeword is removed by the device 110 prior to sending the audio data 511 to the system component(s) 120. In the case of touch input detection or gesture based input detection, the audio data may not include a wakeword.

In some implementations, the system 100 may include more than one system component(s) 120. The system components 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 520 may result in sending audio data to system component(s) 120*a* for processing while detection of the wakeword "Computer" by the wakeword detector may result in sending audio data to system component(s) 120*b* for processing. The system may have a separate wakeword and system for different skills/systems (e.g., "Dungeon Master" for a game play skill/system component(s) 120*c*) and/or such skills/systems may be coordinated by one or more skill component(s) 490 of one or more system components 120.

The system component(s) 120 may be in communication with the system component(s) 121 described in relation to FIG. 1.

The system component(s) 120 may include a system directed input detector 585. The system directed input detector 585 may be configured to determine whether an input to the system (for example speech, a gesture, etc.) is directed to the system or not directed to the system (for example directed to another user, etc.). The system directed input detector 585 may work in conjunction with the wakeword detection component 520. If the system directed input detector 585 determines an input is directed to the system, the device 110 may "wake" and begin sending captured data for further processing (for example, processing audio data using the language processing 592/692, processing captured image data 521, or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 585 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 585 is determining whether an input is potentially device directed. For example, the system may output an orange indicator while considering an input, and may output a green indicator if a system directed input is detected. Other such configurations are possible.

Upon receipt by the system component(s) 120, the audio data 511 may be sent to an orchestrator component 430. The orchestrator component 430 may include memory and logic that enables the orchestrator component 430 to transmit various pieces and forms of data to various components of the system, as well as perform other operations as described herein.

The orchestrator component 430 may send the audio data 511 to a language processing component 592. The language processing component 592 (sometimes also referred to as a spoken language understanding (SLU) component) includes an automatic speech recognition (ASR) component 450 and a natural language understanding (NLU) component 460. The ASR component 450 may transcribe the audio data 511 into text data, tokenized data or other word representation data. The ASR data output by the ASR component 450 represents one or more than one (e.g., in the form of an N-best list) ASR hypotheses representing speech represented in the audio data 511.

In some embodiments, the ASR component 450 interprets the speech in the audio data 511 based on a similarity between the audio data 511 and pre-established language models. For example, the ASR component 450 may compare the audio data 511 with models for sounds (e.g., acoustic units such as phonemes, senons, phones, etc.) and sequences of sounds to identify words that match the sequence of sounds of the speech represented in the audio data 511. In some embodiments, the ASR component 450 may use one or more machine learning models, for example, neural network models, RNN models, RNN-T models, etc. The ASR component 450 sends the ASR data generated thereby to an NLU component 460, via, in some embodiments, the orchestrator component 430. The ASR data sent from the ASR component 450 to the NLU component 460 may include a single top-scoring ASR hypothesis or may include an N-best list including multiple top-scoring ASR hypotheses. An N-best list may additionally include a respective score associated with each ASR hypothesis represented therein.

The speech processing system 592 may further include a NLU component 460. The NLU component 460 may receive the ASR data from the ASR component 450. The NLU component 460 may attempts to make a semantic interpretation of the phrase(s) or statement(s) represented in the text data input therein by determining one or more meanings associated with the phrase(s) or statement(s) represented in the text data. The NLU component 460 may determine an intent representing an action that a user desires be performed and may determine information that allows a device (e.g., the device 110, the system component(s) 120, a skill component 490, a skill support system(s) 125, etc.) to execute the intent. For example, if the ASR data corresponds to "play the 5th Symphony by Beethoven," the NLU component 460 may determine an intent that the system output music and may identify "Beethoven" as an artist/composer and "5th Symphony" as the piece of music to be played. For further example, if the ASR data corresponds to "what is the weather," the NLU component 460 may determine an intent that the system output weather information associated with a geographic location of the device 110. In another example, if the text data corresponds to "turn off the lights," the NLU component 460 may determine an intent that the system turn off lights associated with the device 110 or the user 105. However, if the NLU component 460 is unable to resolve the entity—for example, because the entity is referred to by anaphora such as "this song" or "my next appointment"—the speech processing system 592 can send a decode request to another speech processing system 592 for information regarding the entity mention and/or other context related to the utterance. The speech processing system 592 may augment, correct, or base results data upon the audio data 511 as well as any data received from the other speech processing system 592.

The NLU component 460 may return NLU results data (which may include tagged text data, indicators of intent, etc.) back to the orchestrator component 430. The orchestrator component 430 may forward the NLU results data to a skill component(s) 490. If the NLU results data includes a single NLU hypothesis, the NLU component 460 and the orchestrator component 430 may direct the NLU results data to the skill component(s) 490 associated with the NLU hypothesis. If the NLU results data includes an N-best list of NLU hypotheses, the NLU component 460 and the orchestrator component 430 may direct the top scoring NLU hypothesis to a skill component(s) 490 associated with the top scoring NLU hypothesis. The system may also include a post-NLU ranker 565 which may incorporate other information to rank potential interpretations determined by the NLU component 460. The local device 110 may also include its own post-NLU ranker 665, which may operate similarly to the post-NLU ranker 565.

A skill component may be software running on the system component(s) 120 that is akin to a software application. That is, a skill component 490 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 490. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 490 may operate in conjunction between the system component(s) 120 and other devices, such as the device 110, in order to complete certain functions. Inputs to a skill component 490 may come from speech processing interactions or through other interactions or input sources. A skill component 490 may include hardware, software, firmware, or the like that may be dedicated to a particular skill component 490 or shared among different skill components 490.

A skill support system(s) 125 may communicate with a skill component(s) 490 within the system component(s) 120 and/or directly with the orchestrator component 430 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system component(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 490 dedicated to interacting with the skill support system(s) 125. Unless expressly stated otherwise, reference to a skill, skill device, or skill component may include a skill component 490 operated by the system component(s) 120 and/or skill operated by the skill support system(s) 125. Moreover, the functionality described herein as a skill or skill may be referred to using many different terms, such as an action, bot, app, or the like. The skill 490 and or skill support system(s) 125 may return output data to the orchestrator component 430.

The post-NLU ranker 565 may include a statistical component that produces a ranked list of intent/skill pairs with associated confidence scores. Each confidence score may indicate an adequacy of the skill's execution of the intent with respect to NLU results data associated with the skill. The post-NLU ranker 565 may operate one or more trained models configured to process the NLU results data, skill result data, and the other data in order to output ranked output data. The ranked output data may include an n-best list where the NLU hypotheses in the NLU results data are reordered such that the n-best list in the ranked output data represents a prioritized list of skills to respond to a user input as determined by the post-NLU ranker 565. The ranked output data may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 565 enables the system to better determine the best skill to execute the user input. For example, first and second NLU hypotheses in the NLU results data may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 565 (or other scheduling component such as orchestrator component 430) may solicit the first skill and the second skill to provide potential result data based on the first NLU hypothesis and the second NLU hypothesis, respectively. For example, the post-NLU ranker 565 may send the first NLU hypothesis to the first skill 490a along with a request for the first skill 490a to at least partially execute with respect to the first NLU hypothesis. The post-NLU ranker 565 may also send the second NLU hypothesis to the second skill 490b along with a request for the second skill 490b to at least partially execute with respect to the second NLU hypothesis. The post-NLU ranker 565 receives, from the first skill 490a, first result data generated from the first skill 490a's execution with respect to the first NLU hypothesis. The post-NLU ranker 565 also receives, from the second skill 490b, second results data generated from the second skill 490b's execution with respect to the second NLU hypothesis.

The post-NLU ranker 565 may consider the first skill result data and the second skill result data to alter the first confidence score and the second confidence score of the first NLU hypothesis and the second NLU hypothesis, respectively. That is, the post-NLU ranker 565 may generate a third confidence score based on the first result data and the first confidence score. The third confidence score may correspond to how likely the post-NLU ranker 565 determines the first skill will correctly respond to the user input. The post-NLU ranker 565 may also generate a fourth confidence score based on the second result data and the second confidence score. One skilled in the art will appreciate that a first difference between the third confidence score and the fourth confidence score may be greater than a second difference between the first confidence score and the second confidence score. The post-NLU ranker 565 may also consider the other data to generate the third confidence score and the fourth confidence score. While it has been described that the post-NLU ranker 565 may alter the confidence scores associated with first and second NLU hypotheses, one skilled in the art will appreciate that the post-NLU ranker 565 may alter the confidence scores of more than two NLU hypotheses. The post-NLU ranker 565 may select the result data associated with the skill 490 with the highest altered confidence score to be the data output in response to the current user input. The post-NLU ranker 565 may also consider the ASR output data to alter the NLU hypotheses confidence scores.

The orchestrator component 430 may, prior to sending the NLU results data to the post-NLU ranker 565, associate intents in the NLU hypotheses with skills 490. For example, if a NLU hypothesis includes a <PlayMusic> intent, the orchestrator component 430 may associate the NLU hypothesis with one or more skills 490 that can execute the <PlayMusic> intent. Thus, the orchestrator component 430 may send the NLU results data, including NLU hypotheses paired with skills 490, to the post-NLU ranker 565. In response to ASR output data corresponding to "what should I do for dinner today," the orchestrator component 430 may generates pairs of skills 490 with associated NLU hypotheses corresponding to:

Skill 1/NLU hypothesis including <Help> intent

Skill 2/NLU hypothesis including <Order> intent

Skill 3/NLU hypothesis including <DishType> intent

The post-NLU ranker 565 queries each skill 490, paired with a NLU hypothesis in the NLU output data, to provide skill result data based on the NLU hypothesis with which it is associated. That is, with respect to each skill, the post-NLU ranker 565 colloquially asks the each skill "if given this NLU hypothesis, what would you do with it." According to the above example, the post-NLU ranker 565 may send skills 490 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 565 may query each of the skills 490 in parallel or substantially in parallel.

A skill 490 may provide the post-NLU ranker 565 with various data and indications in response to the post-NLU ranker 565 soliciting the skill 490 for result data. A skill 490 may simply provide the post-NLU ranker 565 with an indication of whether or not the skill can execute with respect to the NLU hypothesis it received. A skill 490 may also or alternatively provide the post-NLU ranker 565 with output data generated based on the NLU hypothesis it received. In some situations, a skill 490 may need further information in addition to what is represented in the received NLU hypothesis to provide output data responsive to the user input. In these situations, the skill 490 may provide the post-NLU ranker 565 with result data indicating slots of a framework that the skill 490 further needs filled or entities that the skill 490 further needs resolved prior to the skill 490 being able to provided result data responsive to the user input. The skill 490 may also provide the post-NLU ranker 565 with an instruction and/or computer-generated speech indicating how the skill 490 recommends the system solicit further information needed by the skill 490. The skill 490 may further provide the post-NLU ranker 565 with an indication of whether the skill 490 will have all needed information after the user provides additional information a single time, or whether the skill 490 will need the user to provide various kinds of additional information prior to the skill 490 having all needed information. According to the above example, skills 490 may provide the post-NLU ranker 565 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator The post-NLU ranker 565 uses the result data provided by the skills 490 to alter the NLU confidence scores. That is, the post-NLU ranker 565 uses the result data provided by the queried skills 490 to create larger differences between the NLU confidence scores generated by the NLU component 460. Without the post-NLU ranker 565, the system may not be confident enough to determine an output in response to a user input, for example when the NLU hypotheses associated with multiple skills are too close for the system to confidently determine a single skill 490 to invoke to respond to the user input. For example, if the system does not implement the post-NLU ranker 565, the system may not be able to determine whether to obtain output data from a general reference information skill or a medical information skill in response to a user input corresponding to "what is acne."

The post-NLU ranker 565 may prefer skills 490 that provide result data responsive to NLU hypotheses over skills 490 that provide result data corresponding to an indication that further information is needed, as well as skills 490 that provide result data indicating they can provide multiple responses to received NLU hypotheses. For example, the post-NLU ranker 565 may generate a first score for a first skill 490a that is greater than the first skill's NLU confidence score based on the first skill 490a providing result data including a response to a NLU hypothesis. For further example, the post-NLU ranker 565 may generate a second score for a second skill 490b that is less than the second skill's NLU confidence score based on the second skill 490b providing result data indicating further information is needed for the second skill 490b to provide a response to a NLU hypothesis. Yet further, for example, the post-NLU ranker 565 may generate a third score for a third skill 490c that is less than the third skill's NLU confidence score based on the third skill 490c providing result data indicating the third skill 490c can provide multiple responses to a NLU hypothesis.

The post-NLU ranker 565 may consider other data in determining scores. The other data may include rankings associated with the queried skills 490. A ranking may be a system ranking or a user-specific ranking. A ranking may indicate a veracity of a skill from the perspective of one or more users of the system. For example, the post-NLU ranker 565 may generate a first score for a first skill 490*a* that is greater than the first skill's NLU processing confidence score based on the first skill 490*a* being associated with a high ranking. For further example, the post-NLU ranker 565 may generate a second score for a second skill 490*b* that is less than the second skill's NLU processing confidence score based on the second skill 490*b* being associated with a low ranking.

The other data may include information indicating whether or not the user that originated the user input has enabled one or more of the queried skills 490. For example, the post-NLU ranker 565 may generate a first score for a first skill 490*a* that is greater than the first skill's NLU processing confidence score based on the first skill 490*a* being enabled by the user that originated the user input. For further example, the post-NLU ranker 565 may generate a second score for a second skill 490*b* that is less than the second skill's NLU processing confidence score based on the second skill 490*b* not being enabled by the user that originated the user input. When the post-NLU ranker 565 receives the NLU results data, the post-NLU ranker 565 may determine whether profile data, associated with the user and/or device that originated the user input, includes indications of enabled skills.

The other data may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 565 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 565 may increase the NLU processing confidence score associated with a first skill configured to output visual data and/or decrease the NLU processing confidence score associated with a second skill configured to output audio data.

The other data may include information indicating the type of device that originated the user input. For example, the device may correspond to a "hotel room" type if the device is located in a hotel room. If a user inputs a command corresponding to "order me food" to the device located in the hotel room, the post-NLU ranker 565 may increase the NLU processing confidence score associated with a first skill 490*a* corresponding to a room service skill associated with the hotel and/or decrease the NLU processing confidence score associated with a second skill 490*b* corresponding to a food skill not associated with the hotel.

The other data may include information indicating a location of the device and/or user that originated the user input. The system may be configured with skills 490 that may only operate with respect to certain geographic locations. For example, a user may provide a user input corresponding to "when is the next train to Portland." A first skill 490*a* may operate with respect to trains that arrive at, depart from, and pass through Portland, Oregon. A second skill 490*b* may operate with respect to trains that arrive at, depart from, and pass through Portland, Maine. If the device and/or user that originated the user input is located in Seattle, Washington, the post-NLU ranker 565 may increase the NLU processing confidence score associated with the first skill 490*a* and/or decrease the NLU processing confidence score associated with the second skill 490*b*. Likewise, if the device and/or user that originated the user input is located in Boston, Massachusetts, the post-NLU ranker 565 may increase the NLU processing confidence score associated with the second skill 490*b* and/or decrease the NLU processing confidence score associated with the first skill 490*a*.

The other data may include information indicating a time of day. The system may be configured with skills 490 that operate with respect to certain times of day. For example, a user may provide a user input corresponding to "order me food." A first skill 490*a* may generate first result data corresponding to breakfast. A second skill 490*b* may generate second result data corresponding to dinner. If the system(s) 120 receives the user input in the morning, the post-NLU ranker 565 may increase the NLU processing confidence score associated with the first skill 490*a* and/or decrease the NLU processing score associated with the second skill 490*b*. If the system(s) 120 receives the user input in the afternoon or evening, the post-NLU ranker 565 may increase the NLU processing confidence score associated with the second skill 490*b* and/or decrease the NLU processing confidence score associated with the first skill 490*a*.

The other data may include information indicating user preferences. The system may include multiple skills 490 configured to execute in substantially the same manner. For example, a first skill 490*a* and a second skill 490*b* may both be configured to order food from respective restaurants. The system may store a user preference (e.g., in the profile storage 570) that is associated with the user that provided the user input to the system components(s) 120 as well as indicates the user prefers the first skill 490*a* over the second skill 490*b*. Thus, when the user provides a user input that may be executed by both the first skill 490*a* and the second skill 490*b*, the post-NLU ranker 565 may increase the NLU processing confidence score associated with the first skill 490*a* and/or decrease the NLU processing confidence score associated with the second skill 490*b*.

The other data may include information indicating system usage history associated with the user that originated the user input. For example, the system usage history may indicate the user originates user inputs that invoke a first skill 490*a* more often than the user originates user inputs that invoke a second skill 490*b*. Based on this, if the present user input may be executed by both the first skill 490*a* and the second skill 490*b*, the post-NLU ranker 565 may increase the NLU processing confidence score associated with the first skill 490*a* and/or decrease the NLU processing confidence score associated with the second skill 490*b*.

It has been described that the post-NLU ranker 565 uses the other data to increase and decrease NLU confidence scores associated with various skills 490 that the post-NLU ranker 565 has already requested result data from. Alternatively, the post-NLU ranker 565 may use the other data to determine which skills 490 to request result data from. For example, the post-NLU ranker 565 may use the other data to increase and/or decrease NLU processing confidence scores associated with skills 490 associated with the NLU results data output by the NLU component 460. The post-NLU ranker 565 may select n-number of top scoring altered NLU processing confidence scores. The post-NLU ranker 565 may then request result data from only the skills 490 associated with the selected n-number of NLU processing confidence scores.

As described, the post-NLU ranker 565 queries multiple skills associated with the NLU results data to provide result data to the post-NLU ranker 565 prior to the post-NLU ranker 565 ultimately determining the skill 490 to be invoked to respond to the user input. Some of the skills 490 may provide result data indicating responses to NLU hypotheses while other skills 490 may providing result data indicating the skills cannot provide responsive data. Whereas a system not implementing the post-NLU ranker 565 may select one of the skills 490 that could not provide a response, the post-NLU ranker 565 only selects a skill 490 that provides the post-NLU ranker 565 with result data corresponding to a response, indicating further information is needed, or indicating multiple responses can be generated.

The post-NLU ranker 565 may select result data, associated with the skill 490 associated with the highest score, for output to the user. Alternatively, the post-NLU ranker 565 may output ranked output data indicating skills 490 and their respective post-NLU ranker rankings. Since the post-NLU ranker 565 receives result data, potentially corresponding to a response to the user input, from the skills 490 prior to post-NLU ranker 565 selecting one of the skills or outputting the ranked output data, little to no latency occurs from the time skills provide result data and the time the system outputs responds to the user.

If the post-NLU ranker 565 selects result audio data to be output to a user and the system determines content should be output audibly, the post-NLU ranker 565 (or another component of the system(s) 120) may cause the device 110a and/or the device 110b to output audio corresponding to the result audio data. If the post-NLU ranker 565 selects result text data to output to a user and the system determines content should be output visually, the post-NLU ranker 565 (or another component of the system(s) 120) may cause the device 110b to display text corresponding to the result text data. If the post-NLU ranker 565 selects result audio data to output to a user and the system determines content should be output visually, the post-NLU ranker 565 (or another component of the system(s) 120) may send the result audio data to the ASR component 450. The ASR component 450 may generate output text data corresponding to the result audio data. The system(s) 120 may then cause the device 110b to display text corresponding to the output text data. If the post-NLU ranker 565 selects result text data to output to a user and the system determines content should be output audibly, the post-NLU ranker 565 (or another component of the system(s) 120) may send the result text data to the TTS component 580. The TTS component 580 may generate output audio data (corresponding to computer-generated speech) based on the result text data. The system(s) 120 may then cause the device 110a and/or the device 110b to output audio corresponding to the output audio data.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

As used herein, a "dialog," "dialog session," "session," or the like refers to various related user inputs and system responses, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. For example, a user may ask a system "Alexa, tell me something interesting" or "Alexa, let's have a conversation." System components that control what actions the system takes in response to various user inputs of a dialog may sometimes be referred to as chatbots.

A user input and performance by the system of a corresponding action responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input, a length of time between performance of an action responsive to the first user input and receipt of the subsequent user input, and/or the substance of the user input or the system response.

The system(s) 100 may include a dialog manager component 572 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 572 may associate a dialog session identifier with the dialog upon identifying that the user is engaging in a dialog with the user. The dialog manager component 572 may track a user input and the corresponding system generated response to the user input as a turn. The dialog session identifier may correspond to multiple turns of user input and corresponding system generated response. The dialog manager component 572 may transmit data identified by the dialog session identifier directly to the orchestrator component 430 or other component. Depending on system configuration the dialog manager 572 may determine the appropriate system generated response to give to a particular utterance or user input of a turn. Or creation of the system generated response may be managed by another component of the system (e.g., the language output component 593, NLG 579, orchestrator component 430, etc.) while the dialog manager 572 selects the appropriate responses. Alternatively, another component of the system component(s) 120 may select responses using techniques discussed herein. The text of a system generated response may be sent to a TTS component 580 for creation of audio data corresponding to the response. The audio data may then be sent to a user device (e.g., device 110) for ultimate output to the user. Alternatively (or in addition) a dialog response may be returned in text or some other form.

The dialog manager 572 may receive the ASR hypothesis/hypotheses (i.e., text data) and make a semantic interpretation of the phrase(s) or statement(s) represented therein. That is, the dialog manager 572 determines one or more meanings associated with the phrase(s) or statement(s) represented in the text data based on words represented in the text data. The dialog manager 572 determines a goal corresponding to an action that a user desires be performed as well as pieces of the text data that allow a device (e.g., the device 110, the system component(s) 120, a skill 490, a skill support system(s) 125, etc.) to execute the intent. If, for example, the text data corresponds to "what is the weather," the dialog manager 572 may determine that that the system component(s) 120 is to output weather information associated with a geographic location of the device 110. In another example, if the text data corresponds to "turn off the lights," the dialog manager 572 may determine that the system component(s) 120 is to turn off lights associated with the device(s) 110 or the user(s) 105.

The dialog manager 572 may send the results data to one or more skill component(s) 490. If the results data includes a single hypothesis, the orchestrator component 430 may send the results data to the skill component(s) 490 associated with the hypothesis. If the results data includes an N-best list of hypotheses, the orchestrator component 430 may send the top scoring hypothesis to a skill component(s) 490 associated with the top scoring hypothesis.

The system component(s) 120 includes a language output component 593. The language output component 593 includes a natural language generation (NLG) component 579 and a text-to-speech (TTS) component 580. The NLG component 579 can generate text for purposes of TTS output to a user. For example the NLG component 579 may generate text corresponding to instructions corresponding to a particular action for the user to perform. The NLG component 579 may generate appropriate text for various outputs as described herein. The NLG component 579 may include one or more trained models configured to output text appropriate for a particular input. The text output by the NLG component 579 may become input for the TTS component 580. Alternatively or in addition, the TTS component 580 may receive text data from a skill component 490 or other system component for output.

The NLG component 579 may include a trained model. The NLG component 579 generates text data (or other natural language representation data) from dialog data received by the dialog manager 572 such that the output text data has a natural feel and, in some embodiments, includes words and/or phrases specifically formatted for a requesting individual. The NLG component 579 may use templates to formulate responses, and/or the NLG component 579 may include models trained from the various templates for forming the output text data. For example, the NLG component

579 may analyze transcripts of local news programs, television shows, sporting events, or any other media program to obtain common components of a relevant language and/or region. As one illustrative example, the NLG component 579 may analyze a transcription of a regional sports program to determine commonly used words or phrases for describing scores or other sporting news for a particular region. The NLG component 579 may further receive, as inputs, a dialog history, an indicator of a level of formality, and/or a command history or other user history such as the dialog history.

The NLG component 579 may generate dialog data based on one or more response templates. Further continuing the example above, the NLG component 579 may select a template in response to the question, "What is the weather currently like?" of the form: "The weather currently is $weather_information$." The NLG component 579 may analyze the logical form of the template to produce one or more textual responses including markups and annotations to familiarize the response that is generated. In some embodiments, the NLG component 579 may determine which response is the most appropriate response to be selected. The selection may, therefore, be based on past responses, past questions, a level of formality, and/or any other feature, or any other combination thereof. Responsive audio data representing the response generated by the NLG component 579 may then be generated using the text-to-speech component 580.

The TTS component 580 may generate audio data (e.g., synthesized speech) from text data using one or more different methods. Text data input to the TTS component 580 may come from a skill component 490, the orchestrator component 430, or another component of the system. In one method of synthesis called unit selection, the TTS component 580 matches text data against a database of recorded speech. The TTS component 580 selects matching units of recorded speech and concatenates the units together to form audio data. In another method of synthesis called parametric synthesis, the TTS component 580 varies parameters such as frequency, volume, and noise to create audio data including an artificial speech waveform. Parametric synthesis uses a computerized voice generator, sometimes called a vocoder.

The device 110 may include image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 105 to request capture of image or video data. The device 110 may process the commands locally or send audio data 511 representing the commands to the system component(s) 120 for processing, after which the system component(s) 120 may return output data that can cause the device 110 to engage its camera.

Upon receipt by the system component(s) 120, the image data 521 may be sent to an orchestrator component 430. The orchestrator component 430 may send the image data 521 to an image processing component 540 that can perform computer vision functions such as object recognition, modeling, reconstruction, etc. For example, the image processing component 540 may detect a person, face, etc. (which may then be identified using user recognition component 595). The device 110 may also include its own image processing component 640.

In some implementations, the image processing component 540/640 can detect the presence of text in an image. In such implementations, the image processing component 540/640 can recognize the presence of text, convert the image data to text data, and send the resulting text data via the orchestrator component 430 to the language processing component 592 for processing by the NLU component 460.

Image matching algorithms, such as those used by image processing component 540, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

The image processing component 540 may implement, among other tasks, an object detection task that may be configured to analyze image data to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection task may involve use of a model (e.g., an encoder) that may process at least a portion of the image data to determine feature data (which may be a high-dimensional feature vector of a 256 dimensions). The feature data is indicative of one or more features that are depicted in the image data. For example, the features may be face data, or other objects, for example as represented by stored data in profile storage 570. Other examples of features may include shapes of body parts or other such features that identify the presence of a human. Other examples of features may include edges of doors, shadows on the wall, texture on the walls, portions of artwork in the environment, and so forth to identify a space. The object detection task may compare detected features to stored data (e.g., in profile storage 570, image data, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by the object detection task, the system may determine which object is actually seen using an object resolution task. For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/ options related to the multiple objects.

The image processing component 540 may be configured to process image data to detect a representation of an approximately two-dimensional (2D) object (such as a piece of paper) or a three-dimensional (3D) object (such as a face). Such recognition may be based on available stored data (e.g., 570, etc.) which in turn may have been provided through an image data ingestion process. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

The system component(s) 120 may include a user recognition component 595 that recognizes one or more users using a variety of data. However, the disclosure is not limited thereto, and the device 110 may include a user recognition component 595 instead of and/or in addition to user recognition component 595 of the system component(s) 120 without departing from the disclosure. User recognition component 595 operates similarly to user recognition component 595.

The user recognition component 595 may take as input the audio data 511 and/or text data output by the ASR component 450. The user-recognition component 595 may perform user recognition by comparing audio characteristics in the audio data 511 to stored audio characteristics of users. The user-recognition component 595 may also perform user recognition by comparing biometric data (e.g., fingerprint data, iris data, etc.), received by the system in correlation with the present user input, to stored biometric data of users assuming user permission and previous authorization. The user-recognition component 595 may further perform user recognition by comparing image data (e.g., including a representation of at least a feature of a user), received by the system in correlation with the present user input, with stored image data including representations of features of different users. The user-recognition component 595 may perform additional user recognition processes, including those known in the art.

The user-recognition component 595 determines scores indicating whether user input originated from a particular user. For example, a first score may indicate a likelihood that the user input originated from a first user, a second score may indicate a likelihood that the user input originated from a second user, etc. The user-recognition component 595 also determines an overall confidence regarding the accuracy of user recognition operations.

Output of the user-recognition component 595 may include a single user identifier corresponding to the most likely user that originated the user input. Alternatively, output of the user-recognition component 595 may include an N-best list of user identifiers with respective scores indicating likelihoods of respective users originating the user input. The output of the user-recognition component 595 may be used to inform NLU processing as well as processing performed by other components of the system.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 6:
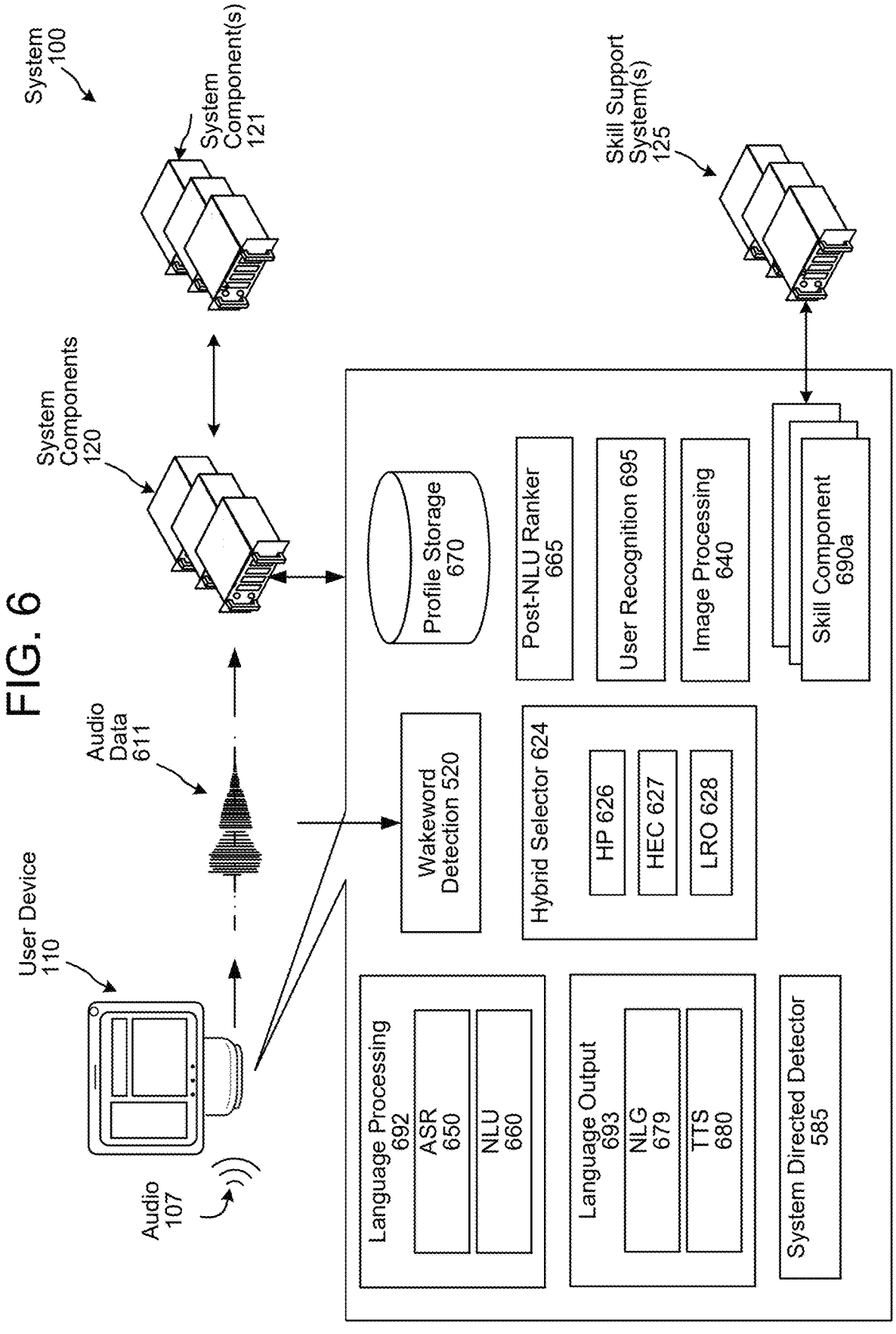
FIG. 6 is a conceptual diagram illustrating components that may be included in a device, according to embodiments of the present disclosure.

Although the components of FIG. 5 may be illustrated as part of system component(s) 120, user device 110, or otherwise, the components may be arranged in other device (s) (such as in user device 110 if illustrated in system component(s) 120 or vice-versa, or in other device(s) altogether) without departing from the disclosure. FIG. 6 illustrates such a configured user device 110.

In at least some embodiments, the system component(s) 120 may receive the audio data 511 from the device 110, to recognize speech corresponding to a spoken input in the received audio data 511, and to perform functions in response to the recognized speech. In at least some embodiments, these functions involve sending directives (e.g., commands), from the system component(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 680) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 5, the device 110 may include a wakeword detection component 520 configured to compare the audio data 511 to stored models used to detect a wakeword (e.g., "Alexa") that indicates to the device 110 that the audio data 511 is to be processed for determining NLU output data (e.g., slot data that corresponds to a named entity, label data, and/or intent data, etc.). In at least some embodiments, a hybrid selector 624, of the device 110, may send the audio data 511 to the wakeword detection component 520. If the wakeword detection component 520 detects a wakeword in the audio data 511, the wakeword detection component 520 may send an indication of such detection to the hybrid selector 624. In response to receiving the indication, the hybrid selector 624 may send the audio data 511 to the system component(s) 120 and/or the ASR component 650. The wakeword detection component 520 may also send an indication, to the hybrid selector 624, representing a wakeword was not detected. In response to receiving such an indication, the hybrid selector 624 may refrain from sending the audio data 511 to the system component(s) 120, and may prevent the ASR component 650 from further processing the audio data 511. In this situation, the audio data 511 can be discarded.

The device 110 may conduct its own speech processing using on-device language processing components, such as an SLU/language processing component 692 (which may include an ASR component 650 and an NLU 660), similar to the manner discussed herein with respect to the SLU component 592 (or ASR component 450 and the NLU component 460) of the system component(s) 120. Language processing component 692 may operate similarly to language processing component 592, ASR component 650 may operate similarly to ASR component 450 and NLU component 660 may operate similarly to NLU component 460. The device 110 may also internally include, or otherwise have access to, other components such as one or more skill components 690 capable of executing commands based on NLU output data or other results determined by the device 110/system component(s) 120 (which may operate similarly to skill components 490), a user recognition component 695 (configured to process in a similar manner to that discussed herein with respect to the user recognition component 595 of the system component(s) 120), profile storage 670 (configured to store similar profile data to that discussed herein with respect to the profile storage 570 of the system component(s) 120), or other components. In at least some embodiments, the profile storage 670 may only store profile data for a user or group of users specifically associated with the device 110. Similar to as described above with respect to skill component 490, a skill component 690 may communicate with a skill support system(s) 125. The device 110 may also have its own language output component 693 which may include NLG component 679 and TTS component 680. Language output component 693 may operate similarly to language processing component 593, NLG component 679 may operate similarly to NLG component 579 and TTS component 680 may operate similarly to TTS component 580.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s) 120.

The hybrid selector 624, of the device 110, may include a hybrid proxy (HP) 626 configured to proxy traffic to/from the system component(s) 120. For example, the HP 626 may be configured to send messages to/from a hybrid execution controller (HEC) 627 of the hybrid selector 624. For example, command/directive data received from the system component(s) 120 can be sent to the HEC 627 using the HP 626. The HP 626 may also be configured to allow the audio data 611 to pass to the system component(s) 120 while also receiving (e.g., intercepting) this audio data 611 and sending the audio data 611 to the HEC 627.

In at least some embodiments, the hybrid selector 624 may further include a local request orchestrator (LRO) 628 configured to notify the ASR component 650 about the availability of new audio data 611 that represents user speech, and to otherwise initiate the operations of local language processing when new audio data 611 becomes available. In general, the hybrid selector 624 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 611 is received, the HP 626 may allow the audio data 611 to pass through to the system component(s) 120 and the HP 626 may also input the audio data 611 to the on-device ASR component 650 by routing the audio data 611 through the HEC 627 of the hybrid selector 624, whereby the LRO 628 notifies the ASR component 650 of the audio data 611. At this point, the hybrid selector 624 may wait for response data from either or both of the system component(s) 120 or the local language processing components. However, the disclosure is not limited thereto, and in some examples the hybrid selector 624 may send the audio data 611 only to the local ASR component 650 without departing from the disclosure. For example, the device 110 may process the audio data 611 locally without sending the audio data 611 to the system component(s) 120.

The local ASR component 650 is configured to receive the audio data 611 from the hybrid selector 624, and to recognize speech in the audio data 611, and the local NLU component 660 is configured to determine a user intent from the recognized speech, and to determine how to act on the user intent by generating NLU output data which may include directive data (e.g., instructing a component to perform an action). Such NLU output data may take a form similar to that as determined by the NLU component 460 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 660) may be selected as usable to respond to a natural language user input, and local response data may be sent (e.g., local NLU output data, local knowledge base information, internet search results, and/or local directive data) to the hybrid selector 624, such as a "ReadyToExecute" response. The hybrid selector 624 may then determine whether to use directive data from the on-device components to respond to the natural language user input, to use directive data received from the system component(s) 120, assuming a remote response is even received (e.g., when the device 110 is able to access the system component(s) 120 over the network(s) 199), or to determine output audio requesting additional information from the user 105.

The device 110 and/or the system component(s) 120 may associate a unique identifier with each natural language user input. The device 110 may include the unique identifier when sending the audio data 611 to the system component(s) 120, and the response data from the system component(s) 120 may include the unique identifier to identify which natural language user input the response data corresponds.

In at least some embodiments, the device 110 may include, or be configured to use, one or more skill components 690 that may work similarly to the skill component(s) 490 implemented by the system component(s) 120. The skill component(s) 690 may correspond to one or more domains that are used in order to determine how to act on a spoken input in a particular way, such as by outputting a directive that corresponds to the determined intent, and which can be processed to implement the desired operation. The skill component(s) 690 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

A "domain" may include various skills relating to a particular area of interest. For example, a music domain may include various skills that can respond to a user's request to play music, enable a user to purchase music, etc. In another example, a smart-home domain may include skills that enable a user to control various home devices. A domain may correspond to different intents and entities. For example, the music domain may correspond to a Play Music intent, Add to Playlist intent, etc. As another example, the smart-home domain may correspond to Turn On intent, Turn Off intent, etc.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 690, a skill system 125, or a combination of a skill component 690 and a corresponding skill system 125.

Similar to the manner discussed with regard to FIG. 5, the local device 110 may be configured to recognize multiple different wakewords and/or perform different categories of tasks depending on the wakeword. Such different wakewords may invoke different processing components of local device 110 (not illustrated in FIG. 6). For example, detection of the wakeword "Alexa" by the wakeword detection component 520 may result in sending audio data to certain language processing components 692/skills 690 for processing while detection of the wakeword "Computer" by the wakeword detector may result in sending audio data different language processing components 692/skills 690 for processing.

One or more of the herein described system component(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

FIG. 7 is a block diagram conceptually illustrating a device 110 that may be used with the system. FIG. 8 is a block diagram conceptually illustrating example components of a remote device, such as the system component(s) 120, which may assist with ASR processing, NLU processing, etc., the system component(s) 121, which may assist with model drift detection, and the skill support system(s) 125. A system (120/121/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/121/125) may be included in the overall system of the present disclosure, such as one or more system components 120 for performing ASR processing, one or more system components 120 for performing NLU processing, one or more system components 121 for model drift detection, one or more skill support systems 125 for performing actions responsive to user inputs, etc. In operation, each of these systems may include computer-readable and computer-executable instructions that reside on the respective device (120/121/125), as will be discussed further below.

Each of these devices (110/120/121/125) may include one or more controllers/processors (704/804), which may each include a central processing unit (CPU) for processing data and computer-readable instructions, and a memory (706/

806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/121/125) may also include a data storage component (708/808) for storing data and controller/processor-executable instructions. Each data storage component (708/808) may individually include one or more non-volatile storage types such as magnetic storage, optical storage, solid-state storage, etc. Each device (110/120/121/125) may also be connected to removable or external non-volatile memory and/or storage (such as a removable memory card, memory key drive, networked storage, etc.) through respective input/output device interfaces (702/802).

Computer instructions for operating each device (110/120/121/125) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/121/125) includes input/output device interfaces (702/802). A variety of components may be connected through the input/output device interfaces (702/802), as will be discussed further below. Additionally, each device (110/120/121/125) may include an address/data bus (724/824) for conveying data among components of the respective device. Each component within a device (110/120/121/125) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110, the system component(s) 120, the system component(s) 121, or the skill support system(s) 125 may include their own dedicated processors, memory, and/or storage. Alternatively, one or more of the components of the device(s) 110, the system component(s) 120, the system component(s) 121, or the skill support system(s) 125 may utilize the I/O interfaces (702/802), processor(s) (704/804), memory (706/806), and/or storage (708/808) of the device(s) 110, system component(s) 120, the system component(s) 121, or the skill support system(s) 125, respectively. Thus, the ASR component 450 may have its own I/O interface(s), processor(s), memory, and/or storage; the NLU component 460 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system component(s) 120, the system component(s) 121, and the skill support system(s) 125, as described herein, are illustrative, and may be located as a stand-alone device or may be included, in whole or in part, as a component of a larger device or system.

Figure 9:
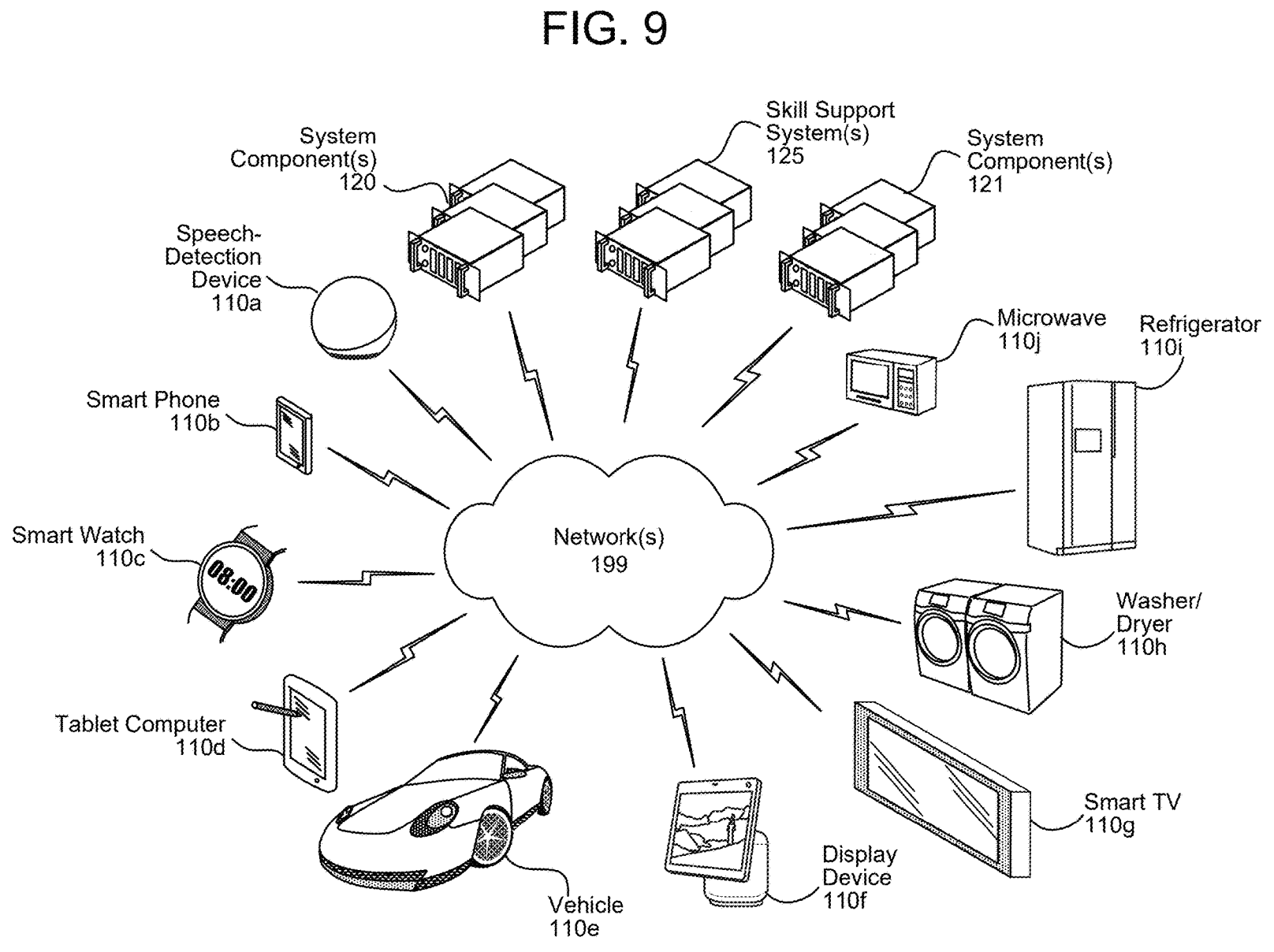

As illustrated in FIG. 9, multiple devices (110a-110j, 120, 121, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system component(s) 120, the system component(s) 121, the skill support system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 460, etc. of one or more system components 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving a plurality of inputs;
   processing the plurality of inputs to determine first embedding data corresponding to the plurality of inputs, the first embedding data including first feature vectors having a first dimensionality;
   processing, using a machine learning model, the first embedding data to classify the plurality of inputs;
   determining that a first subset of the plurality of inputs correspond to a first class;
   processing the first subset of the plurality of inputs to determine second embedding data corresponding to the first subset of the plurality of inputs, the second embedding data including second feature vectors having the first dimensionality;
   processing the second embedding data to determine first reduced embedding data corresponding to the second embedding data, the first reduced embedding data including third feature vectors having a second dimensionality, the second dimensionality being smaller than the first dimensionality;

receiving a first plurality of training samples corresponding to the first class, the first plurality of training samples having been used to train the machine learning model;

processing the first plurality of training samples to determine third embedding data corresponding to the first plurality of training samples, the third embedding data including fourth feature vectors having the first dimensionality;

processing the third embedding data to determine second reduced embedding data corresponding to the third embedding data, the second reduced embedding data including fifth feature vectors having the second dimensionality;

determining that differences between the first reduced embedding data and the second reduced embedding data satisfy one or more conditions; and based on the differences satisfying the one or more conditions, generating a first indicator representing that the machine learning model likely misclassified one or more of the first subset of the plurality of inputs.

2. The computer-implemented method of claim 1, wherein the second dimensionality is two dimensions, and determining that the differences between the first reduced embedding data and the second reduced embedding data satisfy the one or more conditions further comprises:

calculating a value based on a number of data points that are different between the first reduced embedding data and the second reduced embedding data;

determining that the value satisfies a significance level condition; and based on the value satisfying the significance level condition, determining that the first reduced embedding data is statistically different than the second reduced embedding data.

3. The computer-implemented method of claim 1, wherein:

the plurality of inputs are natural language inputs; and the machine learning model is an intent classification model configured to classify natural language inputs to at least a first intent class.

4. The computer-implemented method of claim 1, wherein:

the plurality of inputs are image inputs; and the machine learning model is an object classification model configured to classify image inputs to at least a first object class.

5. The computer-implemented method of claim 1, wherein:

the plurality of inputs are audio inputs; and the machine learning model is an audio classification model configured to classify audio inputs to at least a first audio event class.

6. The computer-implemented method of claim 5, further comprising:

determining that a second subset of the plurality of inputs correspond to a second class;

processing the second subset of the plurality of inputs to determine fourth embedding data corresponding to the second subset of the plurality of inputs, the fourth embedding data including sixth feature vectors having the first dimensionality;

processing the fourth embedding data to determine third reduced embedding data corresponding to the fourth embedding data, the third reduced embedding data including seventh feature vectors having the second dimensionality;

receiving a second plurality of training samples corresponding to the second class, the second plurality of training samples having been used to train the machine learning model;

processing the second plurality of training samples to determine fifth embedding data corresponding to the second plurality of training samples, the fifth embedding data including eighth feature vectors having the first dimensionality;

processing the fifth embedding data to determine fourth reduced embedding data corresponding to the fifth embedding data, the fourth reduced embedding data including ninth feature vectors having the second dimensionality;

determining that differences between the third reduced embedding data and the fourth reduced embedding data satisfy the one or more conditions; and based on the differences satisfying the one or more conditions, generating a second indicator representing that the machine learning model likely misclassified one or more of the second subset of the plurality of inputs.

7. The computer-implemented method of claim 6, further comprising:

in response to the first indicator and the second indicator, determining a third plurality of training samples including at least a first input of the first subset of the plurality of inputs and at least a second input of the second subset of the plurality of inputs; and using the third plurality of training samples to retrain the machine learning model.

8. The computer-implemented method of claim 1, further comprising:

determining the first reduced embedding data using a T-distributed Stochastic Neighbor Embedding (t-SNE) method and the second embedding data; and determining the second reduced embedding data using the t-SNE method and the third embedding data.

9. The computer-implemented method of claim 1, further comprising:

in response to the first indicator, determining a second plurality of training samples including at least one input of the first subset of the plurality of inputs; and using the second plurality of training samples to retrain the machine learning model.

10. A system, comprising:

at least one processor; and at least one memory including instructions that, when executed by the at least one processor, cause the system to:

receive a plurality of inputs;

process the plurality of inputs to determine first embedding data corresponding to the plurality of inputs, the first embedding data including first feature vectors having a first dimensionality;

process, using a machine learning model, the first embedding data to classify the plurality of inputs;

determine that a first subset of the plurality of inputs correspond to a first class;

process the first subset of the plurality of inputs to determine second embedding data corresponding to the first subset of the plurality of inputs, the second embedding data including second feature vectors having the first dimensionality;

process the second embedding data to determine first reduced embedding data corresponding to the second embedding data, the first reduced embedding data including third feature vectors having a second dimensionality, the second dimensionality being smaller than the first dimensionality;

receive a first plurality of training samples corresponding to the first class, the first plurality of training samples having been used to train the machine learning model;

process the first plurality of training samples to determine third embedding data corresponding to the first plurality of training samples, the third embedding data including fourth feature vectors having the first dimensionality;

process the third embedding data to determine second reduced embedding data corresponding to the third embedding data, the second reduced embedding data including fifth feature vectors having the second dimensionality;

determine that differences between the first reduced embedding data and the second reduced embedding data satisfy one or more conditions; and based on the differences satisfying the one or more conditions, generate a first indicator representing that the machine learning model likely misclassified one or more of the first subset of the plurality of inputs.

11. The system of claim 10, wherein the second dimensionality is two dimensions, and wherein the at least one memory includes additional instructions that, when executed by the at least one processor, further cause the system to determine that the differences between the first reduced embedding data and the second reduced embedding data satisfy the one or more conditions at least in part by:

calculating a value based on a number of data points that are different between the first reduced embedding data and the second reduced embedding data;

determining that the value satisfies a significance level condition; and based on the value satisfying the significance level condition, determining that the first reduced embedding data is statistically different than the second reduced embedding data.

12. The system of claim 10, wherein:
the plurality of inputs are natural language inputs; and
the machine learning model is an intent classification model configured to classify natural language inputs to at least a first intent class.

13. The system of claim 10, wherein:
the plurality of inputs are image inputs; and
the machine learning model is an object classification model configured to classify image inputs to at least a first object class.

14. The system of claim 10, wherein:
the plurality of inputs are audio inputs; and
the machine learning model is an audio classification model configured to classify audio inputs to at least a first audio event class.

15. The system of claim 10, wherein the at least one memory includes additional instructions that, when executed by the at least one processor, further cause the system to:

determine that a second subset of the plurality of inputs correspond to a second class;

process the second subset of the plurality of inputs to determine fourth embedding data corresponding to the second subset of the plurality of inputs, the fourth embedding data including sixth feature vectors having the first dimensionality;

process the fourth embedding data to determine third reduced embedding data corresponding to the fourth embedding data, the third reduced embedding data including seventh feature vectors having the second dimensionality;

receive a second plurality of training samples corresponding to the second class, the second plurality of training samples having been used to train the machine learning model;

process the second plurality of training samples to determine fifth embedding data corresponding to the second plurality of training samples, the fifth embedding data including eighth feature vectors having the first dimensionality;

process the fifth embedding data to determine fourth reduced embedding data corresponding to the fifth embedding data, the fourth reduced embedding data including ninth feature vectors having the second dimensionality;

determine that differences between the third reduced embedding data and the fourth reduced embedding data satisfy the one or more conditions; and based on the differences satisfying the one or more conditions, generate a second indicator representing that the machine learning model likely misclassified one or more of the second subset of the plurality of inputs.

16. The system of claim 15, wherein the at least one memory includes additional instructions that, when executed by the at least one processor, further cause the system to:

in response to the first indicator and the second indicator, determine a third plurality of training samples including at least a first input of the first subset of the plurality of inputs and at least a second input of the second subset of the plurality of inputs; and use the third plurality of training samples to retrain the machine learning model.

17. The system of claim 10, wherein the at least one memory includes additional instructions that, when executed by the at least one processor, further cause the system to:

determine the first reduced embedding data using a T-distributed Stochastic Neighbor Embedding (t-SNE) method and the second embedding data; and determine the second reduced embedding data using the t-SNE method and the third embedding data.

18. The system of claim 10, wherein the at least one memory includes additional instructions that, when executed by the at least one processor, further cause the system to:

in response to the first indicator, determine a second plurality of training samples including at least one input of the first subset of the plurality of inputs; and use the second plurality of training samples to retrain the machine learning model.

* * * * *